United States Patent
Kobayashi et al.

(10) Patent No.: US 8,604,117 B2
(45) Date of Patent: Dec. 10, 2013

(54) RESIN COMPOSITION AND RESIN PRODUCT

(75) Inventors: Masao Kobayashi, Aichi-ken (JP); Koichi Ogiso, Aichi-ken (JP); Katsushi Ito, Aichi-ken (JP); Kiyoshi Suenaga, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 973 days.

(21) Appl. No.: 12/452,663

(22) PCT Filed: Aug. 8, 2008

(86) PCT No.: PCT/JP2008/064299
§ 371 (c)(1),
(2), (4) Date: Jan. 21, 2010

(87) PCT Pub. No.: WO2009/022647
PCT Pub. Date: Feb. 19, 2009

(65) Prior Publication Data
US 2010/0137498 A1    Jun. 3, 2010

(30) Foreign Application Priority Data

Aug. 10, 2007 (JP) ................. 2007-210529
Sep. 28, 2007 (JP) ................. 2007-256492
Oct. 24, 2007 (JP) ................. 2007-276825

(51) Int. Cl.
*C08K 3/34* (2006.01)

(52) U.S. Cl.
USPC ............... 524/451; 525/240; 526/351

(58) Field of Classification Search
USPC .............. 524/451; 525/240; 526/351
See application file for complete search history.

(56) References Cited

U.S. PATENT DOCUMENTS

| | | | |
|---|---|---|---|
| 6,608,130 B1 * | 8/2003 | Zanka et al. ........... | 524/451 |
| 2004/0242773 A1 | 12/2004 | Satoh et al. | |
| 2005/0209387 A1 | 9/2005 | Doi et al. | |

FOREIGN PATENT DOCUMENTS

| | | | | |
|---|---|---|---|---|
| EP | 0 926 195 A1 * | 6/1999 | ............ | C08L 53/02 |
| JP | A-07-33919 | 2/1995 | | |
| JP | A-08-134288 | 5/1996 | | |
| JP | A-08-302108 | 11/1996 | | |
| JP | A-09-71712 | 3/1997 | | |
| JP | A-09-87481 | 3/1997 | | |
| JP | A-09-124857 | 5/1997 | | |
| JP | A-10-324725 | 12/1998 | | |
| JP | A-11-189700 | 7/1999 | | |
| JP | A-2004-292723 | 10/2004 | | |
| JP | A-2004-307842 | 11/2004 | | |
| JP | A-2005-126697 | 5/2005 | | |
| JP | A-2005-213490 | 8/2005 | | |
| JP | A-2006-321914 | 11/2006 | | |
| JP | A-2007-91789 | 4/2007 | | |
| JP | A-2007-092049 | 4/2007 | | |
| JP | A-2007-106658 | 4/2007 | | |
| WO | WO 2005/030867 A2 | 4/2005 | | |

OTHER PUBLICATIONS

International Preliminary Report on Patentability issued from the International Bureau of WIPO on Mar. 9, 2010 in the corresponding International patent application No. PCT/JP2008/064299.
International Search Report mailed on Nov. 11, 2008 for the corresponding International patent application No. PCT/JP2008/064299 (English translation enclosed).
Office Action mailed Nov. 27, 2012 in corresponding JP Application No. 2008-205266.
Office Action mailed Dec. 11, 2012 in corresponding JP Application No. 2007-276825.
Office Action mailed Dec. 11, 2012 in corresponding JP Application No. 2007-256492.
European Search Report dated Jan. 14, 2011 issued in corresponding EP patent application No. 08827386.7-2109.

* cited by examiner

*Primary Examiner* — Robert D. Harlan
(74) *Attorney, Agent, or Firm* — Posz Law Group, PLC

(57) ABSTRACT

A resin composition is provided which is improved in fluidability, stiffness and impact resistance and therefore can achieve the reduction in wall thickness of a resin product for automotive interior/exterior applications comprising a polypropylene resin; and a resin product produced from the resin composition.
The resin composition comprises 30 to 65 mass % of an ethylene-propylene block copolymer having a melt flow rate of 60 to 120 g/10 minutes and a Charpy impact strength of 3 kJ/m$^2$ or more; 0 to 25 mass % of a homopolypropylene resin having a melt flow rate of 10 g/10 minutes or more and a modulus of elasticity of 2000 MPa or more; 5 to 20 mass % of an ethylene-α-olefin copolymer rubber having a Mooney viscosity of 20 to 75 or a styrene-ethylene butylenes-styrene copolymer having a styrene component content of 15 to 30 mass %; and 23 to 37 mass % of talc having an average particle diameter of 8 μm or less.

14 Claims, 8 Drawing Sheets

RESIN COMPOSITION AND RESIN PRODUCT

CROSS REFERENCE TO RELATED APPLICATIONS

This application is a U.S. national stage application of PCT/JP2008/064299 filed on Aug. 8, 2008, and claims priority to, and incorporates by reference, Japanese patent application Nos. 2007-210529, filed on Aug. 10, 2007, 2007-256492, filed on Sep. 28, 2007 and 2007-276825 filed on Oct. 24, 2007.

TECHNICAL FIELD

The present invention relates to a resin composition and a resin product produced by molding the resin composition.

BACKGROUND

At present, the resin products for the automobile inner and outer package containing polypropylene resins, having a product wall thickness of 2 mm or more predominate. For example, frequently, an instrument panel has a thickness of around 3 mm, a bumper has a thickness of 2.5 to 3.5 mm and other inner package products have a thickness of 2.2 to 3 mm. Accordingly, even a melt flow rate (MFR) at 230° C. under 21.2 N is 30 g/10 min or less as the fluidity and a flexural modulus at 23° C. is 2,500 MPa or less as the rigidity, the requirements for the physical properties of a polypropylene resin composition used in the above resin products can be sufficiently satisfied.

However, recently, particularly in the field of the automobile inner and outer package resin products, in order to contribute to the global environment such as $CO_2$ reduction, from such a viewpoint that the reduction of the total used amount of the resin is important, as one measure therefor, further thinning of a resin product is required. Polypropylene resin compositions having the above physical properties cannot respond to thinning of the resin products.

Here, although polypropylene resin compositions in which the physical properties such as the rigidity are enhanced are described in Patent Documents 1 to 8, it is considered that even such polypropylene resin compositions cannot sufficiently respond to thinning of the resin products for the automobile inner and outer package containing a polypropylene resin.
[Patent Document 1]
Japanese Patent Application Publication No. JP-A-8-302108
[Patent Document 2]
Japanese Patent Application Publication No. JP-A-9-87481
[Patent Document 3]
Japanese Patent Application Publication No. JP-A-7-33919
[Patent Document 4]
Japanese Patent Application Publication No. JP-A-9-71712
[Patent Document 5]
Japanese Patent Application Publication No. JP-A-10-324725
[Patent Document 6]
Japanese Patent Application Publication No. JP-A-11-189700
[Patent Document 7]
Japanese Patent Application Publication No. JP-A-9-124857
[Patent Document 8]
Japanese Patent Application Publication No. JP-A-8-134288

On the other hand, it is known that it is an effective means for enhancing the rigidity and the impact resistance of a polypropylene resin composition to mix fine particle-shaped (average particle diameter: less than about 1 μm) talc in the composition. However, since a particle-shaped talc is obtained by repeating steps of grinding and classifying talc produced in the shape of a bulk or the like, the smaller the particle diameter thereof is, the more the number of repeating the steps of grinding and classifying is, so that the unit price of talc becomes high. Accordingly, the amount of talc which can be added in an article of utility, such as an automobile inner and outer package resin product is limited in terms of the cost.

In addition, it is proposed to enhance the rigidity and the impact resistance by dynamically crosslinking an elastomer component blended in a polypropylene resin composition by adding a crosslinker or the like (Patent Document 9). However, it is considered that even this polypropylene resin composition cannot sufficiently respond to the thinning of resin products for the automobile inner and outer package containing a polypropylene resin.
[Patent Document 9]
Japanese Patent Application Publication No. JP-A-7-304910

SUMMARY

Thus, it is an object of the present invention to provide a resin composition and a resin products containing this resin composition which are capable of responding to the thinning of resin products for the automobile inner and outer package containing a polypropylene resin by enhancing the fluidity, the rigidity and the impact resistance.

DETAILED DESCRIPTION

A. Resin Composition

Figure 1:
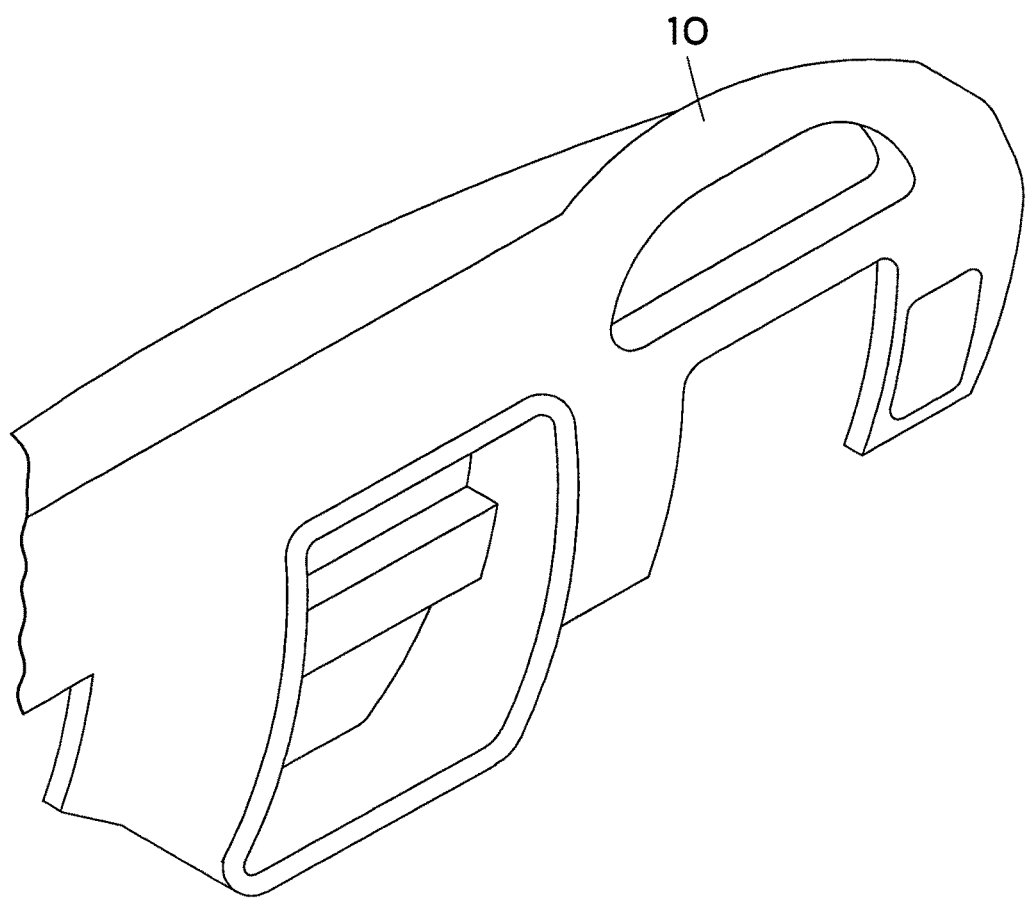
FIG. 1 is a perspective view of an instrument panel in an example of the present invention.

For achieving the above object, the resin composition of the present invention contains: 30 to 65% by mass of an ethylene-propylene block copolymer having a melt flow rate (MFR) of 60 to 120 g/10 min at 230° C. under 21.2 N measured according to ISO 1133 and a Charpy impact strength of 3 kJ/m² or more measured according to ISO 179;

0 to 25% by mass of a homo-polypropylene resin (h-PP) having a melt flow rate (MFR) of 10 g/10 min or more at 230° C. under 21.2 N measured according to ISO 1133 and a flexural modulus of 2,000 Mpa or more measured according to ISO 178;

6 to 20% by mass of an elastomer; and 23 to 37% by mass of talc having an average particle diameter of 8 μm or less measured by a laser diffraction scattering particle size distribution measuring method, wherein a flexural modulus measured according to ISO 178 is 2,600 MPa or more;

an Izod impact strength at 23° C. measured according to ISO 180 is 15 kJ/m$^2$ or more; and a melt flow rate at 230° C. under 21.2 N measured according to ISO 1133 is 30 g/10 min or more.

Here, the average particle diameter used for talc is the value of an average particle diameter D50 of the particle diameter of talc measured by a laser diffraction scattering particle size distribution measuring method.

In addition, it is preferred that the talc has: an average measured particle diameter of 0.1 to 0.7 μm as obtained by measuring a diameter of a perfect circle having the same area as each area of a plurality of talcs appearing in a range of 400 square μm of a cross section of a molded article of the resin composition and by averaging the diameter; and an average distance between particles of 0.1 to 0.9 μm as obtained by measuring respective distances between each talc appearing in the range and another selected ten talcs whose distances therefrom are the first to tenth smallest distances in ascending order; calculating each average distance of these measure distances; and averaging the average distance.

In addition, it is preferred that a rubber particle containing the elastomer has: an average measured particle diameter of 0.2 to 0.5 μm as obtained by measuring a diameter of a perfect circle having the same area as each area of a plurality of rubber particles appearing in a range of 100 square μm of a cross section of a molded article of the resin composition and by averaging the diameter; and an average distance between particles of 0.3 to 1.3 μm as obtained by measuring respective distances between each rubber particle appearing in the range and another selected ten rubber particles whose distances therefrom are the first to tenth smallest distances in ascending order; calculating each average distance of these measure distances; and averaging the average distance.

Moreover, since the fluidity, the rigidity and the impact resistance are enhanced depending on the type (particle diameter) of talc, it is preferred that the resin composition of the present invention contains 30 to 55% by mass of the ethylene-propylene block copolymer, 5 to 25% by mass of the homo-polypropylene resin, 8 to 20% by mass of the elastomer, and 23 to 37% by mass of the talc having the average particle diameter of 7 μm or less. Further, it is also preferred that the talc is produced by blending on purpose 3% by mass or more of talc (A) having the average particle diameter of less than 1 μm, the flexural modulus is 2,800 MPa or more, the Izod impact strength is 15 kJ/m$^2$ or more, and the melt flow rate is 30 g/10 min or more.

Here, the talc produced by blending on purpose 3% by mass or more of the talc (A) means talc in which the talc (A) is blended in the resin composition on such a purpose that the blending amount of the talc (A) in the resin composition, that is the amount of the talc (A) relative to the total amount of the resin composition, becomes 3% by mass or more.

In addition, since the rigidity and the impact resistance are enhanced by dynamically crosslinking a blended elastomer component using a crosslinker, it is preferred that the resin composition of the present invention contains 30 to 55% by mass of the ethylene-propylene block copolymer, 10 to 25% by mass of the homo-polypropylene resin, 10 to 20% by mass of the elastomer in which at least a part of the elastomer is dynamically crosslinked using a crosslinker, and 23 to 37% by mass of the talc having the average particle diameter of 8 μm or less. Further, it is also preferred that the additive amount of an active component of the crosslinker is 0.02 to 0.25 parts by mass relative to 100 parts by mass of the total amount of the ethylene-propylene block copolymer, the homo-polypropylene resin, the elastomer and the talc, and the flexural modulus is 2,800 MPa or more, the Izod impact strength is 20 kJ/m$^2$ or more, and the melt flow rate is 30 g/10 min or more.

In addition, it is preferred that the resin composition can be molded in a wall thickness of the sites other than reinforced sites of the molded article of less than 2 mm.

B. Resin Products

For achieving the object, the resin product of the present invention is produced by molding the resin composition.

For achieving the above object, the another resin product of the present invention is produced by molding a resin composition which contains: 30 to 65% by mass of an ethylene-propylene block copolymer having a melt flow rate of 60 to 120 g/10 min at 230° C. under 21.2 N measured according to ISO 1133 and a Charpy impact strength of 3 kJ/m$^2$ or more measured according to ISO 179;

0 to 25% by mass of a homo-polypropylene resin having a melt flow rate of 10 g/10 min or more at 230° C. under 21.2 N measured according to ISO 1133 and a flexural modulus of 2,000 MPa or more measured according to ISO 178;

6 to 20% by mass of an elastomer; and 23 to 37% by mass of talc, wherein the talc has: an average measured particle diameter of 0.1 to 0.7 μm as obtained by measuring a diameter of a perfect circle having the same area as each area of a plurality of talcs appearing in a range of 400 square μm of a cross section of the resin product and by averaging the diameter; and an average distance between particles of 0.1 to 0.9 μm as obtained by measuring respective distances between each talc appearing in the range and another selected ten talcs whose distances therefrom are the first to tenth smallest distances in ascending order; calculating each average distance of these measured distances; and averaging the average distance, a rubber particle containing the elastomer has: an average measured particle diameter of 0.2 to 0.5 μm as obtained by measuring a diameter of a perfect circle having the same area as each area of a plurality of rubber particles appearing in a range of 100 square μm of a cross section of the resin product and by averaging the diameter; and an average distance between particles of 0.3 to 1.3 μm as obtained by measuring respective distances between each rubber particle appearing in the range and another selected ten rubber particles whose distances therefrom are the first to tenth smallest distances in ascending order; calculating each average distance of these measured distances; and averaging the average distance, a flexural modulus measured according to ISO 178 is 2,600 MPa or more, an Izod impact strength at 23° C. measured according to ISO 180 is 15 kJ/m$^2$ or more, and a melt flow rate at 230° C. under 21.2 N measured according to ISO 1133 is 30 g/10 min or more.

The aspect of each element of the present invention is exemplified below.

1. Ethylene-Propylene Block Copolymer (b-PP)

The ethylene-propylene block copolymer is not particularly limited, however, when the melt flow rate (MFR) at 230° C. under 21.2 N measured according to ISO 1133 is less than 60 g/10 min, the fluidity of the resin composition is impaired and when MFR is more than 120 g/10 min, the impact resistance of the resin composition is impaired. The melt flow rate is preferably 80 to 110 g/10 min. When the Charpy impact strength measured according to ISO 179 is less than 3 kJ/m$^2$, the impact resistance of the resin composition is impaired. The Charpy impact strength is preferably 3.5 kJ/m$^2$ or more.

The blending amount of the ethylene-propylene block copolymer is preferably 30 to 55% by mass, more preferably 35 to 55% by mass. Particularly, when the talc is produced by blending on purpose 3% by mass or more of the talc (A) having an average particle diameter of less than 1 μm, the blending amount thereof is preferably 32 to 55% by mass. On the other hand, when at least a part of the elastomer is dynamically crosslinked by a crosslinker, the blending amount thereof is preferably 30 to 40% by mass.

2. Homo-Polypropylene Resin (h-PP)

The homo-polypropylene resin is not particularly limited, however, when the melt flow rate (MFR) at 230° C. under 21.2 N measured according to ISO 1133 is less than 10 g/10 min, the fluidity of the resin composition is impaired. It is preferably 11 g/10 min or more, more preferably 12 g/10 min or more. When the flexural modulus measured according to ISO 178 is less than 2,000 MPa, the rigidity of the resin composition is impaired. It is preferably 2,050 MPa or more, more preferably 2,300 MPa or more.

In addition, it is preferred that the homo-polypropylene resin contains: a rigid component having a relatively short relaxation time (spin-spin relaxation time, T2) at 23° C. measured with a pulse nuclear magnetic resonance (NMR) by a solid echo method; and another component having a relatively long relaxation time (T2), and the ratio of the rigid component is 92.4 to 93.0% by mass. When the ratio of the rigid component is less than 92.4% by mass, the rigidity of the resin composition is not enhanced and when the ratio is more than 93.0% by mass, although the rigidity is enhanced, the lowering of the impact resistance of the resin composition becomes large.

Here, the rigid component having a relatively short relaxation time (T2) measured with a pulse NMR by a solid echo method means a component in which a relaxation curve thereof is a curve having a relatively short relaxation time (T2) out of two divided curves which are obtained by dividing a relaxation curve of the homo-polypropylene resin obtained by measuring with a pulse NMR by a solid echo method into two curves having different relaxation times (T2) using the Lorentzian function by a least square method. The relaxation time (T2) is varied depending on the motility of the component, that is, the more rigid the component is, the smaller the motility is and the shorter the relaxation time (T2) is.

The homo-polypropylene resin may not be blended. When it is blended, although the blending amount thereof is not particularly limited, it is preferably 15 to 22% by mass. It is also effective to blend talc in a larger amount for securing the rigidity of the resin composition. However, in the case where the homo-polypropylene resin is blended, not only the lowering of the impact resistance of the resin composition, but also the lowering of the fluidity of the resin composition become smaller than in the case where talc is blended in a large amount. Therefore, by blending a homo-polypropylene resin in which the ratio of the rigid component is 92.4 to 93.0% by mass, the rigidity and the impact resistance of the resin composition are both balanced at a high level and it becomes possible to secure the fluidity. When talc is particularly produced by blending on purpose 3% by mass or more of talc (A) having an average particle diameter of less than 1 μm, the blending amount thereof is preferably 5 to 20% by mass. On the other hand, when at least a part of the elastomer is dynamically crosslinked using a crosslinker, the blending amount is preferably 15 to 25% by mass.

3. Elastomer

The elastomer is not particularly limited, however, is preferably one type or two or more types of ethylene-α-olefin copolymer rubbers or one type or two or more types of styrene-based thermoplastic elastomers.

In addition, the elastomer is not particularly limited, however, at least a part thereof is preferably crosslinked by dynamic crosslinking using a crosslinker.

Further, the blending amount of the elastomer is preferably 10 to 20% by mass, more preferably 10 to 15% by mass.

Further, the blending amount of the elastomer in the case where the elastomer is one type or two or more types of ethylene-α-olefin copolymer rubbers, that is, the blending amount of one type or two or more types of ethylene-α-olefin copolymer rubbers in the resin composition is not particularly limited, however, is preferably 11 to 17% by mass, more preferably 13 to 15% by mass. Particularly, when talc is produced by blending on purpose 3% by mass or more of talc (A) having an average particle diameter of less than 1 μm, the blending amount thereof is preferably 8 to 20% by mass, more preferably 10 to 18% by mass, further more preferably 10 to 13% by mass. When at least a part of the elastomer is crosslinked by dynamically crosslinking using a crosslinker, the blending amount thereof is preferably 10 to 20% by mass, more preferably 13 to 20% by mass.

Further, the blending amount of the elastomer in the case where the elastomer is one type or two or more types of styrene-based thermoplastic elastomers, that is, the blending amount of one type or two or more types of styrene-based thermoplastic elastomers in the resin composition is not particularly limited, however, is preferably 7 to 13% by mass, more preferably 10 to 12% by mass. Particularly, when talc is produced by blending on purpose 3% by mass or more of talc (A) having an average particle diameter of less than 1 μm, the blending amount thereof is preferably 8 to 20% by mass, more preferably 8 to 15% by mass, further more preferably 8 to 13% by mass.

3-1. Ethylene-α-Olefin Copolymer Rubber

The ethylene-α-olefin copolymer rubber is not particularly limited, however, at least a part thereof is preferably crosslinked by dynamically crosslinking using a crosslinker.

The ethylene-α-olefin copolymer rubber is not particularly limited, however, is preferably an ethylene-propylene copolymer rubber (EPM), an ethylene-butene copolymer rubber (EBM), an ethylene-octene copolymer rubber (EOM) or an ethylene-propylene-nonconjugated diene copolymer rubber (EPDM). In addition, the ethylene-α-olefin copolymer rubber has preferably a Mooney viscosity (ML(1+4) 100° C.) of 20 to 75 as measured according to ISO 667 under the following conditions: the shape of a rotor of an L shape, a pre-heating time of 1 minute, a rotation time of a rotor of 4 minutes, and 100° C. When the Mooney viscosity is less than 20, the rigidity and the impact resistance of the resin composition are impaired. It is more preferably 30 to 75 ML(1+4) 100° C., further more preferably 30 to 65 ML(1+4) 100° C.

Here, the dynamic crosslinkage means to perform the crosslinkage while kneading a mixture in a molten state or a semi-molten state. Accordingly, the elastomer in which at least a part thereof is dynamically crosslinked using a crosslinker means an elastomer in which at least a part thereof is crosslinked when a mixture thereof with other raw material components (ethylene-propylene block copolymer, homo-polypropylene resin, talc etc.) in a molten state or a semi-molten state is kneaded in the presence of a crosslinker.

In addition, the method of kneading is not particularly limited and a method (apparatus) generally used for kneading a polypropylene resin can be used. Specific examples thereof can include a Banbury mixer, a single-screw extruder and a twin-screw extruder. The kneading temperature varies depending on the added crosslinker and is not particularly limited, however, is preferably 160 to 240° C. The kneading time varies depending on the added crosslinker and is not particularly limited, however, is preferably 1 to 10 minute(s).

3-2. Styrene-Based Thermoplastic Elastomer

The styrene-based thermoplastic elastomer is not particularly limited, however, is preferably styrene-ethylene-butylene-styrene copolymer rubber (SEBS).

The styrene-ethylene-butylene-styrene copolymer rubber is not particularly limited, however, the amount of contained styrene (including polystyrene), that is the content of styrene components is preferably 15 to 30% by mass. When the content is less than 15% by mass, the rigidity of the resin composition is impaired and on the other hand, when the content is more than 30% by mass, the impact resistance of the resin composition is impaired.

4. Crosslinker

The crosslinker is not particularly limited so long as it can crosslink an elastomer, however, examples thereof can include organic peroxides and phenol-based crosslinkers.

The additive amount of an active component of the crosslinker varies depending on the type of the crosslinker, however, is preferably 0.02 to 0.25 parts by mass relative to 100 parts by mass of the total amount of the ethylene-propylene block copolymer, the homo-polypropylene resin, the elastomer and talc. When the additive amount is less than 0.02 parts by mass, the rigidity of the resin composition is impaired and on the other hand, when the additive amount is more than 0.25 parts by mass, the fluidity and the impact resistance of the resin composition are impaired.

In addition, the active component of the crosslinker means a compound component acting for crosslinking the elastomer. Some of generally available crosslinkers contain a diluent (filler) taking into consideration the convenience of the handling or the like. Accordingly, the active component of the crosslinker in a generally available crosslinker containing such a diluent is specifically a residual component after subtracting the diluent from such a crosslinker.

4-1. Organic Peroxide

The organic peroxide is not particularly limited, however, examples thereof can include benzoyl peroxide, 1,1-bis(t-butylperoxy)-3,3,5-trimethylcyclohexane, n-butyl-4,4'-bis(t-butylperoxy)valerate, dicumyl peroxide, t-butylperoxy benzoate, di-t-butyl peroxide, α,α'-bis(t-butylperoxy) diisopropylbenzene, 2,5-dimethyl-2,5-bis(t-butylperoxy) hexane, 2,5-dimethyl-2,5-bis(t-butylperoxy)hexine-3 and t-butylperoxy cumene.

The additive amount of an active component of the organic peroxide as a crosslinker varies depending on the type thereof, however, is preferably 0.02 to 0.16 parts by mass relative to 100 parts by mass of the total amount of the ethylene-propylene block copolymer, the homo-polypropylene resin, the elastomer and the talc. When the additive amount is less than 0.02 parts by mass, the rigidity of the resin composition is impaired and on the other hand, when the additive amount is more than 0.16 parts by mass, the fluidity and the impact resistance of the resin composition are impaired. The additive amount is more preferably 0.04 to 0.16 parts by mass, further more preferably 0.04 to 0.12 parts by mass.

4-2. Phenol-Based Crosslinker

The phenol-based crosslinker is not particularly limited, however, examples thereof can include an alkylphenol formaldehyde resin and a brominated alkylphenol formaldehyde resin.

The additive amount of an active component of the phenol-based crosslinker varies depending on the type thereof, however, is preferably 0.05 to 0.25 parts by mass relative to 100 parts by mass of the total amount of the ethylene-propylene block copolymer, the homo-polypropylene resin, the elastomer and the talc. When the additive amount is less than 0.05 parts by mass, the rigidity of the resin composition is impaired and on the other hand, when the additive amount is more than 0.25 parts by mass, the fluidity and the impact resistance of the resin composition are impaired. The additive amount is more preferably 0.1 to 0.25 parts by mass, further more preferably 0.1 to 0.2 parts by mass.

4-3. Crosslinking Assistant

In addition to the crosslinker, if necessary, a crosslinking assistant may be blended in the resin composition, or may not be blended.

5. Talc

When the blending amount of talc is less than 23% by mass, the rigidity of the resin composition is impaired and when the blending amount is more than 37% by mass, the impact resistance and the fluidity of the resin composition are impaired. The blending amount is more preferably 25 to 35% by mass.

In addition, the talc is not particularly limited, however, since the physical properties of the resin composition such as the rigidity, the impact resistance and the fluidity are changed depending on the type (average particle diameter) of blended talc, the average particle diameter of talc measured by a laser diffraction scattering particle size distribution measuring method is 8 μm or less, more preferably 7 μm or less, further more preferably 5 μm or less.

Here, examples of the talc having an average particle diameter of 7 μm or less measured by a laser diffraction scattering particle size distribution measuring method can include talc (A), which is a so-called nanotalc, having an average particle diameter of less than 1 μm measured by a laser diffraction scattering particle size distribution measuring method, talc (B) having an average particle diameter of 1 μm or more and less than 4 μm measured by a laser diffraction scattering particle size distribution measuring method, and talc (C) having an average particle diameter of 4 μm or more and 7 μm or less measured by a laser diffraction scattering particle size distribution measuring method.

Since the rigidity and the impact resistance of the resin composition are enhanced, it is preferred that in talc, 3% by mass or more of talc (A) having an average particle diameter of less than 1 μm measured by a laser diffraction scattering particle size distribution measuring method are blended on purpose.

Since the rigidity and the impact resistance of the resin composition are enhanced, it is preferred that talc is composed of only talc (A) having an average particle diameter of less than 1 μm measured by a laser diffraction scattering particle size distribution measuring method.

Since the fluidity of the resin composition can be enhanced and the cost can be reduced while maintaining the rigidity and the impact resistance of the resin composition, it is preferred that: the talc is a mixed talc composed of talc (A) having an average particle diameter of less than 1 μm measured by a laser diffraction scattering particle size distribution measuring method and talc (B) having an average particle diameter of 1 μm or more and less than 4 μm measured by a laser diffraction scattering particle size distribution measuring method; and the relationship of a % by mass which is an amount of talc (A), that is, a % by mass which is a blending amount of talc (A) in the resin composition, with t % by mass which is an amount of the mixed talc, that is, t % by mass which is a blending amount of the mixed talc in the resin composition, satisfies: a≥−0.2t+11.0. In addition, the total of a % by mass which is an amount of talc (A) and b % by mass which is an amount of talc (B), that is, b % by mass which is a blending amount of talc (B) in the resin composition is t % by mass which is an amount of the mixed talc (a+b=t).

Since the fluidity of the resin composition can be enhanced and the cost can be reduced while maintaining the rigidity and the impact resistance of the resin composition, it is preferred that: the talc is a mixed talc composed of talc (A) having an average particle diameter of less than 1 μm measured by a laser diffraction scattering particle size distribution measuring method and talc (C) having an average particle diameter of 4 μm or more and 7 μm or less measured by a laser diffraction scattering particle size distribution measuring method; and the relationship of a % by mass which is an amount of talc (A), that is, a % by mass which is a blending amount of talc (A) in the resin composition, with t % by mass which is an amount of the mixed talc, that is, t % by mass which is a blending amount of the mixed talc in the resin composition, satisfies: a≥0.3t+12.5. In addition, the total of a % by mass which is an amount of talc (A) and c % by mass which is an amount of talc (C), that is, c % by mass which is a blending amount of talc (C) in the resin composition is t % by mass which is an amount of the mixed talc (a+c=t).

Since the fluidity of the resin composition can be enhanced and the cost can be reduced while maintaining the rigidity and the impact resistance of the resin composition, it is preferred that: the talc is a mixed talc composed of talc (A) having an average particle diameter of less than 1 μm measured by a laser diffraction scattering particle size distribution measuring method, talc (B) having an average particle diameter of 1 μm or more and less than 4 μm measured by a laser diffraction scattering particle size distribution measuring method and talc (C) having an average particle diameter of 4 μm or more and 7 μm or less measured by a laser diffraction scattering particle size distribution measuring method; and the relationship of a % by mass which is an amount of talc (A), that is, a % by mass which is a blending amount of talc (A) in the resin composition, with t % by mass which is an amount of the mixed talc, that is, t % by mass which is a blending amount of the mixed talc in the resin composition, satisfies: a≥−0.3t+15.5, and the relationship of c % by mass which is an amount of talc (C), that is, c % by mass which is a blending amount of talc (C) in the resin composition, with t % by mass which is an amount of the mixed talc satisfies: c≤0.5t−7.5. In addition, the total of a % by mass which is an amount of talc (A), b % by mass which is an amount of talc (B), that is, b % by mass which is a blending amount of talc (B) in the resin composition, and c % by mass which is an amount of talc (C) is t % by mass which is an amount of the mixed talc (a+b+c=t). Accordingly, c % by mass is made by subtracting the sum of a % by mass and b % by mass from t % by mass (c=t−a−b), in other words, the sum of a % by mass and b % by mass is made by subtracting c % by mass from t % by mass (a+b=t−c).

6. Other Additives

In the scope of which the object of the present invention is not impaired, additives such as antioxidants, light stabilizers, lubricants, plasticizers, colorants, dispersants, flame retardants and the like can be blended.

7. Molding Method

The method for molding resin products using the above resin composition is not particularly limited, however, examples thereof can include injection molding and press molding.

8. Application of Resin Products

The application of resin products is not particularly limited, however, examples thereof can include automobile outer package products such as a bumper and a cowl louver and automobile inner package products such as an instrument panel, a front pillar, a console, a center cluster and a deck side trimmer.

9. Site of Molded Article Other than Reinforced Site

The reinforced site is referred to as strengthening ribs, thick-walled parts and the like provided at pivotal points corresponding to the application, the shape, or the like of the molded article (resin product) for developing a necessary strength without increasing the total thickness of the molded article. Therefore, the site of the molded article other than reinforced sites is referred to as sites of the molded article other than this reinforced sites.

The thickness of the site of the molded article other than reinforced sites varies depending on the application, the shape, or the like of the molded article (resin product), however, in the case of resin products for the automobile inner and outer package, for example, it is preferred that the thickness thereof is less than 2 mm (more preferably 1.8 mm or less) and such a thickness can be achieved by the resin composition of the present invention. For example, a bumper and an instrument panel are produced with a site thickness of 1.6 to 1.9 mm and other inner package resin products such as a door trimmer are produced with a site thickness of 1.0 to 1.7 mm. In addition, depending on the application of inner and outer package products, it is possible to produce these products with a site thickness of 1.0 mm or less.

EFFECTS OF THE INVENTION

According to the present invention, by enhancing the fluidity, the rigidity and the impact resistance, a resin composition capable of responding to the thinning of resin products for the automobile inner and outer package containing polypropylene resins; and resin products containing the resin composition, can be provided.

BEST MODES FOR CARRYING OUT THE INVENTION

A resin composition contains: 30 to 65% by mass of an ethylene-propylene block copolymer having a melt flow rate of 60 to 120 g/10 min at 230° C. under 21.2 N measured according to ISO 1133 and a Charpy impact strength of 3 kJ/m$^2$ or more measured according to ISO 179;

0 to 25% by mass of a homo-polypropylene resin having a melt flow rate of 10 g/10 min or more at 230° C. under 21.2 N measured according to ISO 1133 and a flexural modulus of 2,000 Mpa or more measured according to ISO 178;

5 to 20% by mass of one type or two or more types of ethylene-α-olefin copolymer rubbers having a Mooney viscosity of 20 to 75 as measured according to ISO 667 under the following conditions: the shape of a rotor of an L shape, a pre-heating time of 1 minute, a rotation time of a rotor of 4 minutes, and 100° C., or one type or two or more types of styrene-ethylene-buthylene-styrene copolymer having a content of styrene components of 15 to 30% by mass; and 23 to 37% by mass of talc having an average particle diameter of 8 μm or less measured by a laser diffraction scattering particle size distribution measuring method, wherein a flexural modulus measured according to ISO 178 is 2,600 MPa or more;

an Izod impact strength at 23° C. measured according to ISO 180 is 15 kJ/m$^2$ or more; and a melt flow rate at 230° C. under 21.2 N measured according to ISO 1133 is 30 g/10 min or more.

EXAMPLES

The resin composition of the present invention is used in an instrument panel 10 or the like as shown in FIG. 1.

In Examples of the present invention, physical properties of resin compositions were measured in 17 types of formulations shown in the following Table 1. As Comparative Examples, the physical properties of resin compositions in 17 types of formulations shown were also measured in the following Table 2. The unit of a blending amount of each raw material component in the column of the formulation in each Table is % by mass. However, an additive amount of the organic peroxide*1 (butyl-based peroxide), is indicated in a unit of parts by mass relative to 100 parts by mass of the total amount of other raw material components.

In addition, in Examples 4, 5, 6, 8 and 12 and Comparative Examples 6 and 7, the states of talc and a rubber particle (average measured particle diameter and average distance between particles) at a cross section of a molded article of each sample were measured and the result thereof is shown in Table 3.

As raw material components in Examples or Comparative Examples of the present invention, there were used 6 types of ethylene-propylene block copolymers (b-PP) having different physical properties; 5 types of homo-polypropylene resins (h-PP) having different physical properties or the like; ethylene-α-olefin copolymer rubbers, such as 2 types of ethylene-propylene copolymer rubbers (EPM) having different Mooney viscosities, 2 types of ethylene-butene copolymer rubbers (EBM) having different Mooney viscosities, ethylene-octene copolymer rubber (EOM) and ethylene-propylene-nonconjugated diene copolymer rubber (EPDM); 4 types of styrene-ethylene-butylene-styrene copolymer rubbers (SEBS) having different contents of styrene components; and 4 types of talc having different average particle diameters.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Formulation | ethylene-propylene block copolymer (b-PP) | b-PP1 | | | | | | | | | |
| | | b-PP2 | | 55 | | | | | | | |
| | | b-PP3 | 55 | | 35 | | 35 | 35 | 35 | 40 | 40 |
| | | b-PP4 | | | | 35 | | | | | |
| | | b-PP5 | | | | | | | | | |
| | | b-PP6 | | | | | | | | | |
| | homo-polypropylene resin (h-PP) | h-PP1 | | | 20 | 20 | 20 | 20 | 20 | 15 | 15 |
| | | h-PP2 | | | | | | | | | |
| | | h-PP3 | | | | | | | | | |
| | | h-PP4 | | | | | | | | | |
| | | h-PP5 | | | | | | | | | |
| | EPM (16 ML(1 + 4) 100° C.) | | | | | | | | | | |
| | EPM (36 ML(1 + 4) 100° C.) | | | | | | | 13 | | | |
| | EBM (40 ML(1 + 4) 100° C.) | | 13 | 13 | 13 | 13 | 13 | | | | |
| | EBM (65 ML(1 + 4) 100° C.) | | | | | | | | | | |
| | EOM (45 ML(1 + 4) 100° C.) | | | | | | | | 13 | | |
| | EPDM (74 ML(1 + 4) 100° C.) | | | | | | | | | 15 | 15 |
| | SEBS (styrene amount: 42% by mass) | | | | | | | | | | |
| | SEBS (styrene amount: 30% by mass) | | | | | | | | | | |
| | SEBS (styrene amount: 18% by mass) | | | | | | | | | | |
| | SEBS (styrene amount: 12% by mass) | | | | | | | | | | |
| | Talc(D) (average particle diameter: 8.1 μm) | | | | | | | | | | |
| | Talc(C) (average particle diameter: 6.2 μm) | | | | | | | 32 | | | |
| | Talc(C) (average particle diameter: 4.4 μm) | | 32 | 32 | 32 | 32 | | 32 | 32 | 30 | 30 |
| | Talc(A) (average particle diameter: 0.7 μm) | | | | | | | | | | |
| | Organic peroxide *1 | | | | | | | | | | 0.2 |
| Physical property | MFR (g/10 min) | | 43.8 | 30.4 | 33.6 | 34.1 | 34.2 | 33.8 | 43.8 | 30.5 | 30.2 |
| | flexural modulus (MPa) | | 2613 | 2672 | 2762 | 2700 | 2620 | 2630 | 2707 | 2690 | 2810 |
| | Izod impact strength (kJ/m$^2$) | | 28.3 | 23.1 | 26.7 | 21.2 | 16.5 | 20.2 | 22.6 | 28.2 | 22.7 |

| | | | Example 10 | Example 11 | Example 12 | Example 13 | Example 14 | Example 15 | Example 16 | Example 17 |
|---|---|---|---|---|---|---|---|---|---|---|
| Formulation | ethylene-propylene block copolymer (b-PP) | b-PP1 | | | | | | | | |
| | | b-PP2 | | | | | | | | |
| | | b-PP3 | 35 | 35 | 35 | 45 | 40 | 35 | 30 | 35 |
| | | b-PP4 | | | | | | | | |
| | | b-PP5 | | | | | | | | |
| | | b-PP6 | | | | | | | | |

TABLE 1-continued

| | | | | | | | | | |
|---|---|---|---|---|---|---|---|---|---|
| homo-polypropylene resin (h-PP) | h-PP1 | 22 | 22 | 22 | 20 | 20 | 20 | 25 | |
| | h-PP2 | | | | | | | | |
| | h-PP3 | | | | | | | | |
| | h-PP4 | | | | | | | | 20 |
| | h-PP5 | | | | | | | | |
| EPM (16 ML(1 + 4) 100° C.) | | | | | | | | | |
| EPM (36 ML(1 + 4) 100° C.) | | | | | | | | | |
| EBM (40 ML(1 + 4) 100° C.) | | | | | | | | 13 | 13 |
| EBM (65 ML(1 + 4) 100° C.) | | | | | | | | | |
| EOM (45 ML(1 + 4) 100° C.) | | | | | | | | | |
| EPDM (74 ML(1 + 4) 100° C.) | | | | | | | | | |
| SEBS (styrene amount: 42% by mass) | | | | | | | | | |
| SEBS (styrene amount: 30% by mass) | | 11 | | | | | | | |
| SEBS (styrene amount: 18% by mass) | | | 11 | 11 | 10 | 10 | 10 | | |
| SEBS (styrene amount: 12% by mass) | | | | | | | | | |
| Talc(D) (average particle diameter: 8.1 μm) | | | | | | | | | |
| Talc(C) (average particle diameter: 6.2 μm) | | | | | | | | | |
| Talc(C) (average particle diameter: 4.4 μm) | | 32 | 32 | | 25 | 30 | 35 | 32 | 32 |
| Talc(A) (average particle diameter: 0.7 μm) | | | | 32 | | | | | |
| Organic peroxide *1 | | | | | | | | | |
| Physical property | MFR (g/10 min) | 31.6 | 33.2 | 31.1 | 38.9 | 33.3 | 32.4 | 30.5 | 32.6 |
| | flexural modulus (MPa) | 3037 | 2874 | 3002 | 2635 | 2866 | 3070 | 2900 | 2700 |
| | Izod impact strength (kJ/m$^2$) | 23.6 | 29.4 | 29.8 | 27.8 | 26.4 | 21.6 | 25.3 | 25.5 |

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Formulation | ethylene-propylene block copolymer (b-PP) | b-PP1 | 55 | | | | | | | | |
| | | b-PP2 | | | | | | | | | |
| | | b-PP3 | | | | 35 | 35 | 35 | 40 | 35 | 50 |
| | | b-PP4 | | | | | | | | | |
| | | b-PP5 | | 50 | | | | | | | |
| | | b-PP6 | | | 50 | | | | | | |
| | homo-polypropylene resin (h-PP) | h-PP1 | | | | | | 20 | 15 | 22 | 20 |
| | | h-PP2 | | | | 20 | | | | | |
| | | h-PP3 | | | | | 20 | | | | |
| | | h-PP4 | | | | | | | | | |
| | | h-PP5 | | | | | | | | | |
| | EPM (16 ML(1 + 4) 100° C.) | | | | | | | | 15 | | |
| | EPM (36 ML(1 + 4) 100° C.) | | | | | | | | | | |
| | EBM (40 ML(1 + 4) 100° C.) | | 13 | | | 13 | 13 | 13 | | | |
| | EBM (65 ML(1 + 4) 100° C.) | | | 15 | 15 | | | | | | |
| | EOM (45 ML(1 + 4) 100° C.) | | | | | | | | | | |
| | EPDM (74 ML(1 + 4) 100° C.) | | | | | | | | | | |
| | SEBS (styrene amount: 42% by mass) | | | | | | | | | 11 | |
| | SEBS (styrene amount: 30% by mass) | | | | | | | | | | |
| | SEBS (styrene amount: 18% by mass) | | | | | | | | | | 10 |
| | SEBS (styrene amount: 12% by mass) | | | | | | | | | | |
| | Talc(D) (average particle diameter: 8.1 μm) | | | | | | | 32 | | | |
| | Talc(C) (average particle diameter: 6.2 μm) | | | | | | | | | | |
| | Talc(C) (average particle diameter: 4.4 μm) | | 32 | 35 | 35 | 32 | 32 | | 30 | 32 | 20 |
| | Talc(A) (average particle diameter: 0.7 μm) | | | | | | | | | | |
| | Organic peroxide *1 | | | | | | | | | | |
| Physical property | MFR (g/10 min) | | 26.3 | 44.1 | 48.8 | 26.2 | 35.2 | 35.3 | 39.2 | 32.1 | 45.2 |
| | flexural modulus (MPa) | | 2650 | 2499 | 2501 | 2531 | 2385 | 2611 | 2409 | 3083 | 2106 |
| | Izod impact strength (kJ/m$^2$) | | 28.6 | 6.6 | 8.9 | 24.3 | 21.1 | 14.9 | 12.5 | 14.9 | 30.1 |

TABLE 2-continued

|  |  |  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| Formulation | ethylene-propylene block copolymer (b-PP) | b-PP1 |  |  |  |  |  |  |  |  |
|  |  | b-PP2 |  |  |  |  |  |  |  |  |
|  |  | b-PP3 | 30 | 35 | 30 | 50.5 | 49 | 25 | 70 | 35 |
|  |  | b-PP4 |  |  |  |  |  |  |  |  |
|  |  | b-PP5 |  |  |  |  |  |  |  |  |
|  |  | b-PP6 |  |  |  |  |  |  |  |  |
|  | homo-polypropylene resin (h-PP) | h-PP1 | 20 | 22 | 27 | 15 |  | 20 |  |  |
|  |  | h-PP2 |  |  |  |  |  |  |  |  |
|  |  | h-PP3 |  |  |  |  |  |  |  |  |
|  |  | h-PP4 |  |  |  |  |  |  |  |  |
|  |  | h-PP5 |  |  |  |  |  |  |  | 20 |
|  | EPM (16 ML(1 + 4) 100° C.) |  |  |  |  |  |  |  |  |  |
|  | EPM (36 ML(1 + 4) 100° C.) |  |  |  |  |  | 21 |  |  |  |
|  | EBM (40 ML(1 + 4) 100° C.) |  |  |  |  | 13 |  |  |  | 13 |
|  | EBM (65 ML(1 + 4) 100° C.) |  |  |  |  |  |  |  |  |  |
|  | EOM (45 ML(1 + 4) 100° C.) |  |  |  |  |  |  |  |  |  |
|  | EPDM (74 ML(1 + 4) 100° C.) |  |  |  |  |  |  | 20 |  |  |
|  | SEBS (styrene amount: 42% by mass) |  |  |  |  |  |  |  |  |  |
|  | SEBS (styrene amount: 30% by mass) |  |  |  |  |  |  |  |  |  |
|  | SEBS (styrene amount: 18% by mass) |  | 10 |  |  | 4.5 |  |  | 5 |  |
|  | SEBS (styrene amount: 12% by mass) |  |  | 11 |  |  |  |  |  |  |
|  | Talc(D) (average particle diameter: 8.1 μm) |  |  |  |  |  |  |  |  |  |
|  | Talc(C) (average particle diameter: 6.2 μm) |  |  |  |  |  |  |  |  |  |
|  | Talc(C) (average particle diameter: 4.4 μm) |  | 40 | 32 | 30 | 30 | 30 | 35 | 25 | 32 |
|  | Talc(A) (average particle diameter: 0.7 μm) |  |  |  |  |  |  |  |  |  |
|  | Organic peroxide *1 |  |  |  |  |  |  |  |  |  |
| Physical property | MFR (g/10 min) |  | 22.8 | 34.0 | 29.8 | 50.2 | 23.3 | 18.6 | 55.3 | 30.8 |
|  | flexural modulus (MPa) |  | 3233 | 2107 | 2977 | 3148 | 1980 | 2433 | 2213 | 3023 |
|  | Izod impact strength (kJ/m²) |  | 14.0 | 9.9 | 18.4 | 6.1 | 23.4 | 26.6 | 7.8 | 14.8 |

TABLE 3

|  |  | Example 4 | Example 5 | Example 6 | Example 8 | Example 12 | Comparative Example 6 | Comparative Example 7 |
|---|---|---|---|---|---|---|---|---|
| Talc | average measured particle diameter (μm) | 0.40 | 0.68 |  |  | 0.13 | 0.82 |  |
|  | average distance between particles (μm) | 0.55 | 0.80 |  |  | 0.15 | 0.93 |  |
| Rubber particle | average measured particle diameter (μm) | 0.31 |  | 0.45 | 0.25 |  |  | 0.53 |
|  | average distance between particles (μm) | 0.45 |  | 1.21 | 0.36 |  |  | 1.32 |

Each sample was kneaded by using a twin-screw extruder at a set temperature of 160 to 200° C.

Each physical property in Examples and Comparative Examples of the present invention was measured as follows. In addition, physical properties in the below-described Examples and Comparative Examples were measured also in the same manner.

(1) Melt Flow Rate (MFR)

MFR was measured according to ISO 1133 under the following conditions: test temperature of 230° C.; and test load of 21.2 N.

(2) Flexural Modulus

Flexural modulus was measured according to ISO 178.

(3) Izod Impact Strength

Izod impact strength was measured according to ISO 180 using a test piece in which a notch having a depth of 2 mm was provided under the condition of a temperature of 23° C.

(4) Average Measured Particle Diameter of Talc and a Rubber Particle in a Cross Section of the Molded Article (Resin Product)

The test piece having a shape of a square (150 mm×150 mm) and a thickness of 2.0 mm was produced by molding each kneaded sample by using an injection molding machine (FANUC: 100 ton) under the following molding conditions: set temperature of 230° C.; mold temperature of 20 to 35° C.; and filling time of 0.8 sec.

Figure 5:
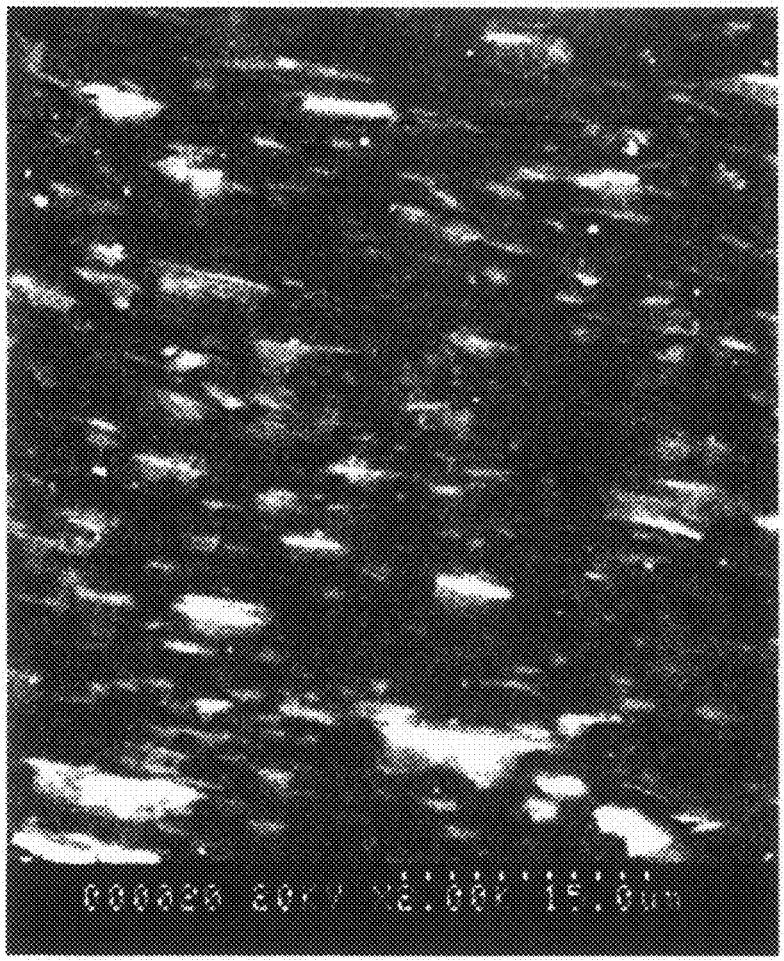
FIG. 5 is a microscope photograph showing a range for measuring an average measured particle diameter and an average distance between particles of talc.
Figure 6:
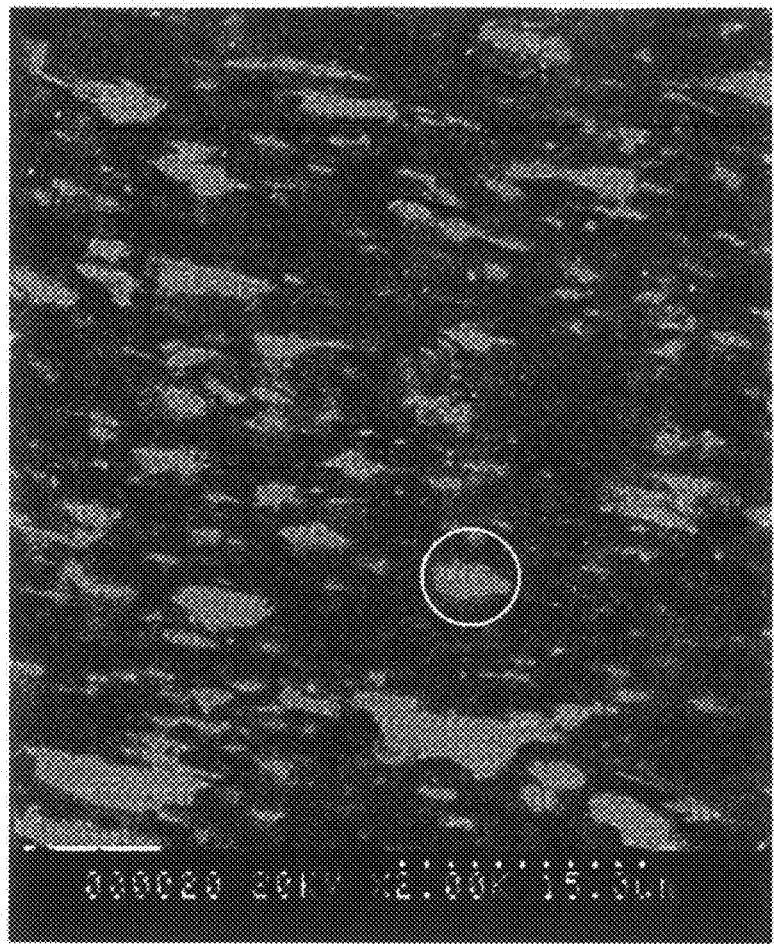
FIG. 6 is a microscope photograph showing the above range which has been subjected to an image analysis treatment.
Figure 7:
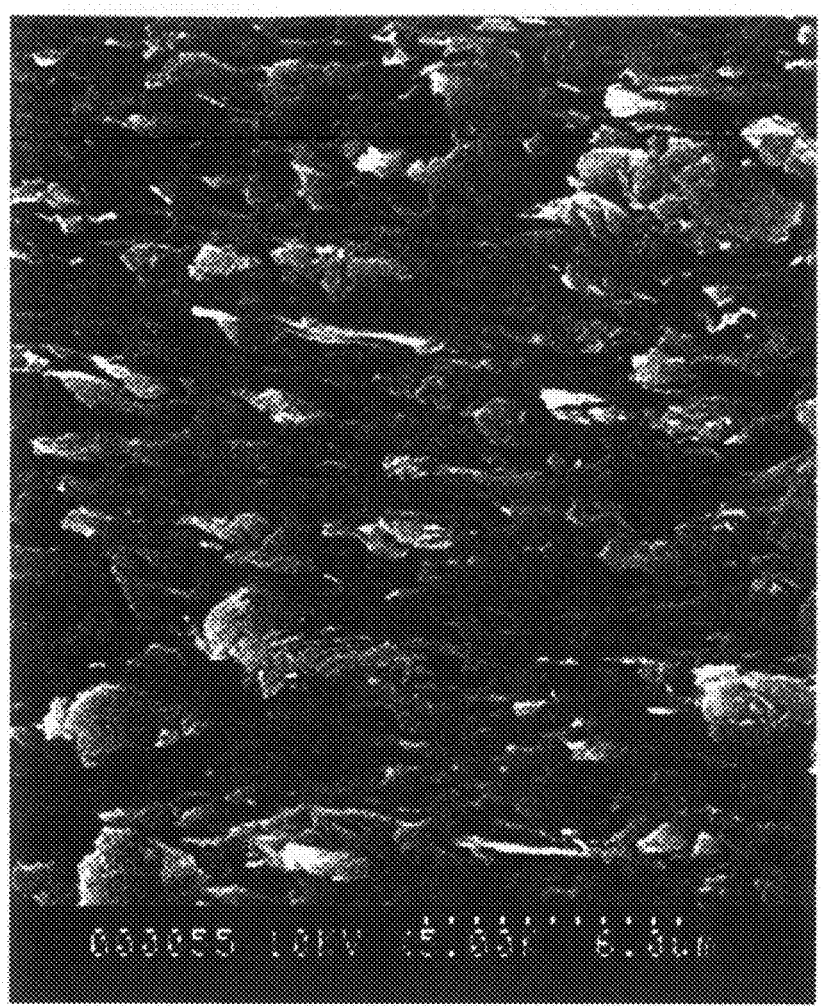
FIG. 7 is a microscope photograph showing a range for measuring an average measured particle diameter and an average distance between particles of rubber particles.
Figure 8:
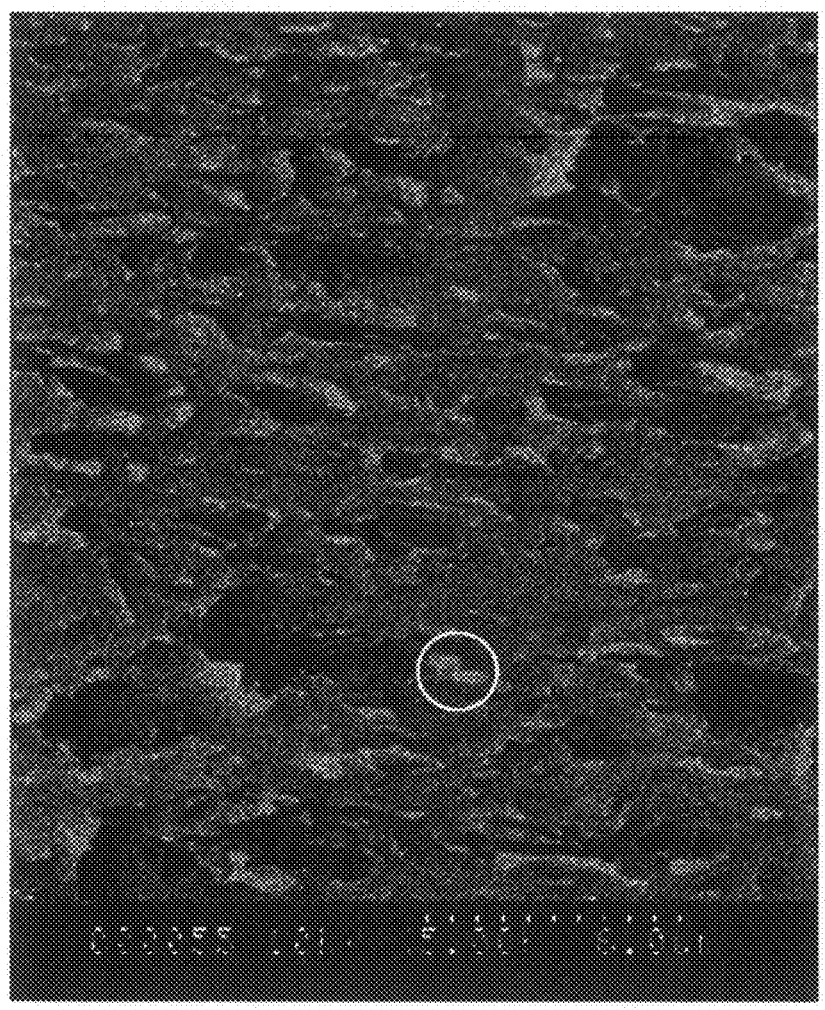
FIG. 8 is a microscope photograph showing the above range which has been subjected to an image analysis treatment.

The images of an arbitrary cross section of each test piece (for example, a substantially central part of the cross section produced by cutting the test piece substantially at the center of a plane of the test piece in the thickness direction) molded as described above were produced by enlarging (enlarging factor: 2,000) a range of about 48 μm×54 μm for the measurement of talc and by enlarging (enlarging factor: 5,000) a range of about 19 μm×22 μm for the measurement of rubber particle (with respect to the measuring range, it is considered that with 400 square μm for the talc and with 100 square μm for the rubber particle, physical properties of each of them can be thoroughly comprehend, however, at this time, for a more reliable measurement, 4 or more times of each of the above ranges were measured) by using a scanning electron microscope. Then, by subjecting these enlarged images (an image for talc: FIG. 5, an image for rubber particle: FIG. 7) to an image analysis treatment (binarization treatment), an area occupied by talc (in FIG. 6, for example, a circled position having a color lighter than those of other positions) in an image (FIG. 6) or an area occupied by rubber particle (in FIG. 8, for example, a circled position having a color lighter than those of other positions) in an image (FIG. 8) were specified.

The area of each of the specified areas occupied by talc or by rubber particle was calculated by subjecting each of the areas to an image analysis (as an image analysis software, trade name: "WIN ROOF"; manufactured by Mitani Corporation, was used). Then, a diameter of a perfect circle having the same area as the calculated area was obtained with respect to each of the occupied areas, and an arithmetic average of the thus obtained values was designated as the average measured particle diameter of talc or rubber particle.

(5) Average Distance Between Particles of Talc and Rubber Particle in a Cross Section of Molded Article (Resin Product)

The center of gravity of each of the above-specified areas occupied by talc or by rubber particle in the above images was measured by subjecting the areas to an image analysis (as an image analysis software, trade name: "WIN ROOF"; manufactured by Mitani Corporation, was used). The respective distances between the center of gravity of each talc or rubber particle obtained as described above and the centers of gravity of another ten talcs or rubber particles having distances which are the first to tenth smallest (shortest) distances therefrom in ascending order were measured, and the average value (average distance) of these distances was calculated by arithmetically averaging these distances. Further, the average values of respective talcs or rubber particles were arithmetically averaged to calculate the average distance between particles of talc or rubber particle.

Physical properties (melt flow rate (MFR) and Charpy impact strength) of 6 types of ethylene-propylene block copolymers (b-PP) used in Examples or Comparative Examples of the present invention are shown in the following Table 4.

TABLE 4

| | Melt flow rate (MFR) (g/10 min) | Charpy impact strength (kJ/m²) |
| --- | --- | --- |
| b-PP1 | 55 | 5.5 |
| b-PP2 | 60 | 3.5 |
| b-PP3 | 100 | 5.0 |
| b-PP4 | 105 | 3.0 |
| b-PP5 | 115 | 2.5 |
| b-PP6 | 125 | 3.0 |

Physical properties and the like (melt flow rate (MFR), flexural modulus and amount of rigid components) of 5 types of homo-polypropylene resins (h-PP) used in Examples or Comparative Examples of the present invention are shown in the following Table 5.

TABLE 5

| | Melt flow rate (MFR) (g/10 min) | Flexural modulus (Mpa) | Amount of rigid components (% by mass) |
| --- | --- | --- | --- |
| h-PP1 | 12 | 2400 | 92.6 |
| h-PP2 | 2.4 | 2100 | 92.2 |
| h-PP3 | 21 | 1900 | 91.8 |
| h-PP4 | 11 | 2050 | 92.4 |
| h-PP5 | 10 | 2450 | 93.2 |

The conditions for measuring physical properties and the like of each raw material component used in Examples and Comparative Examples of the present invention are shown below. In addition, the conditions for measuring physical properties and the like of each raw material component used in the below-described Examples and Comparative Examples were also the same.

(a) Melt Flow Rate (MFR)

MFR was measured according to ISO 1133 under the following conditions: test temperature of 230° C.; and test load of 21.2 N.

(b) Flexural Modulus

Flexural modulus was measured according to ISO 178.

(c) Charpy Impact Strength

Charpy impact strength was measured according to ISO 179 using a test piece in which a notch having a depth of 2 mm was provided.

(d) Amount of Rigid Components

Amount of rigid components was measured at 23° C. using a pulse NMR apparatus by a solid echo method. The relaxation curve (c1) for a polypropylene resin obtained in this measurement was divided into two curves having different relaxation times (T2) using the Lorentzian function by a least square method starting with a relaxation curve having a longer relaxation time (T2). In the two divided curves, a curve having a relatively short relaxation time (T2) was regarded as a relaxation curve (c2) for rigid components and a curve having a relatively long relaxation time (T2) was regarded as a relaxation curve (c3) for other components. Then, the ratio (h2/(h2+h3)×100) of a value (h2) of the relaxation curve (c2) for rigid components at the time 0 relative to the sum (h2+h3) of a value (h2) of the relaxation curve (c2) for rigid components at the time 0 and a value (h3) of the relaxation curve (c3) for other components at the time 0 was calculated as the amount of rigid components (the ratio of rigid components).

(e) Mooney Viscosity

Mooney viscosity was measured according to ISO 667 under the following conditions: the shape of a rotor of an L shape; a pre-heating time of 1 minute; a rotation time of a rotor of 4 minutes; and a test temperature of 100° C.

(f) Average Particle Diameter

The particle diameter was measured by a laser diffraction scattering particle size distribution measuring method to obtain the average particle diameter D50.

As is apparent from the above results, all of Examples (Examples 1 to 17) could secure high fluidity (high MFR), high rigidity (high flexural modulus) and high impact resistance (high Izod impact strength) required for a resin composition capable of responding to the thinning of resin products for the automobile inner and outer package containing polypropylene resins.

Using resin compositions of Examples (Examples 1 to 17), a deck side trim, an instrument panel, a bumper or the like having a wall thickness of sites other than reinforced sites thereof of 1.0 mm could be molded under the following molding conditions.

Injection molding machine: trade name: "IS 1800"; manufactured by Toshiba Corporation
Mold temperature: 25° C. (oil temperature)
Molding temperature: 200 to 230° C.
Injection pressure:
  during injection; 1,650 kgf/cm$^2$ (162 MPa)
  during retention; 330 kgf/cm$^2$ (32.3 MPa)
Injection time: 15 sec
Cooling time: 25 sec In addition, these resin products could satisfy performances as the product (thermal shock, rigidness, impact by ball-drop).

Next, effects by a difference of the type (particle diameter) of talc were studied. As Examples of the present invention, the physical properties of resin compositions were measured in 27 types of formulations shown in the following Tables 6 and 7. In addition, as Comparative Examples, the physical properties of resin compositions were measured in 10 types of formulations shown in the following Table 7. The unit of a blending amount of each raw material component in the column of the formulation in each table is % by mass.

As raw material components in Examples and Comparative Examples of the present invention, there were used 5 types of ethylene-propylene block copolymers (b-PP) having different physical properties described in Table 4; 3 types of homo-polypropylene resins (h-PP) having different physical properties and the like described in Table 5; ethylene-α-olefin copolymer rubbers, such as ethylene-propylene copolymer rubber (EPM), ethylene-butene copolymer rubber (EBM), ethylene-octene copolymer rubber (EOM) and ethylene-propylene-nonconjugated diene copolymer rubber (EPDM); styrene-ethylene-butylene-styrene copolymer rubber (SEBS); and 4 types of talc having different average particle diameters (0.7 μm, 2.5 μm, 4.4 μm and 6.2 μm).

Figure 2:
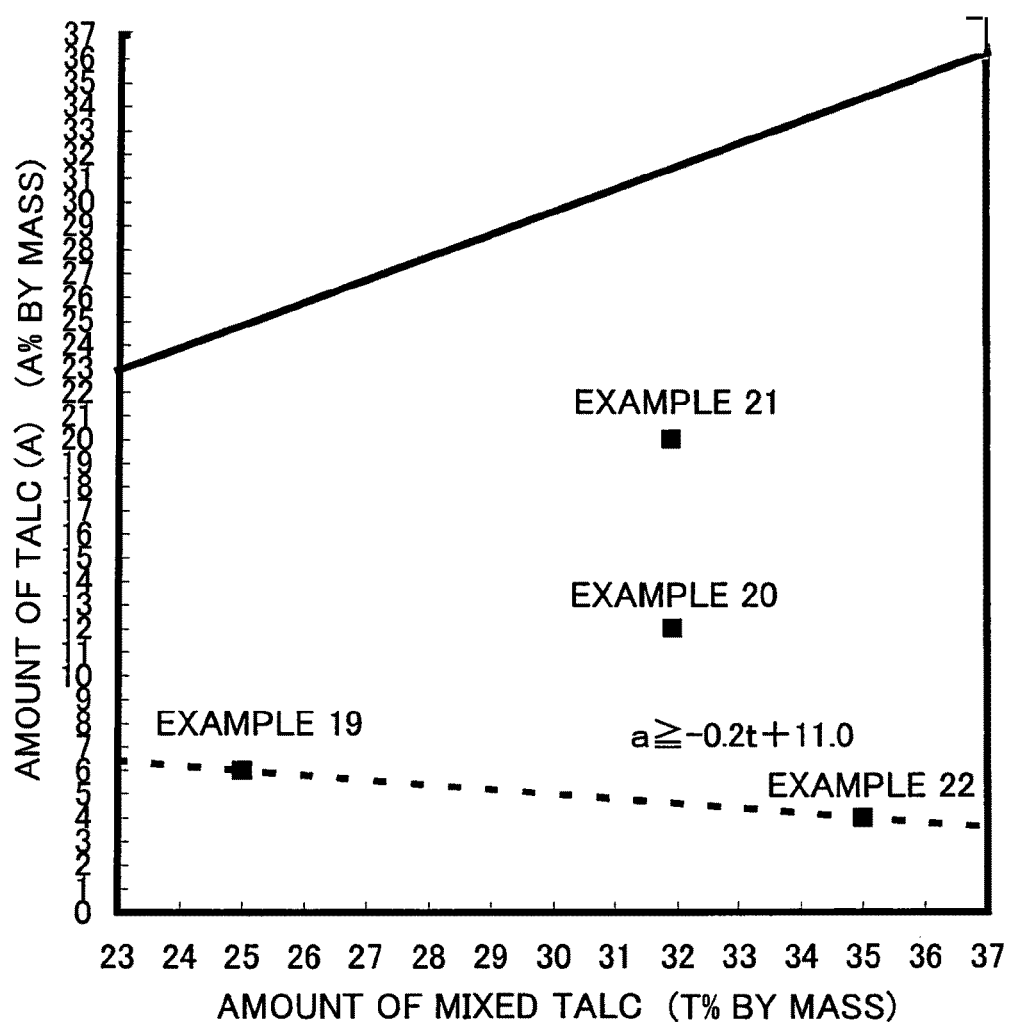
FIG. 2 is a graph showing the relationship between the amount of talc (A) and the amount of a mixed talc.
Figure 3:
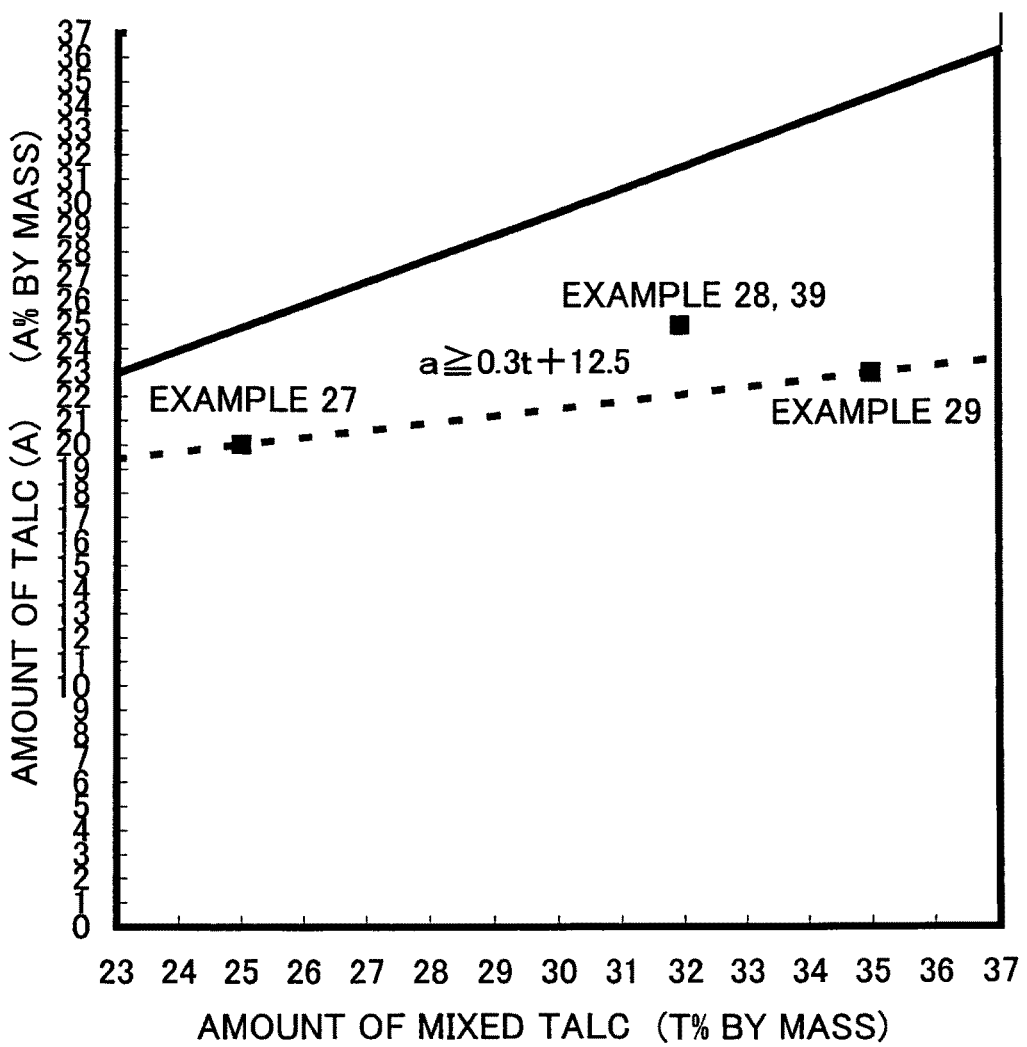
FIG. 3 is a graph showing the relationship between the amount of talc (A) and the amount of a mixed talc.
Figure 4:
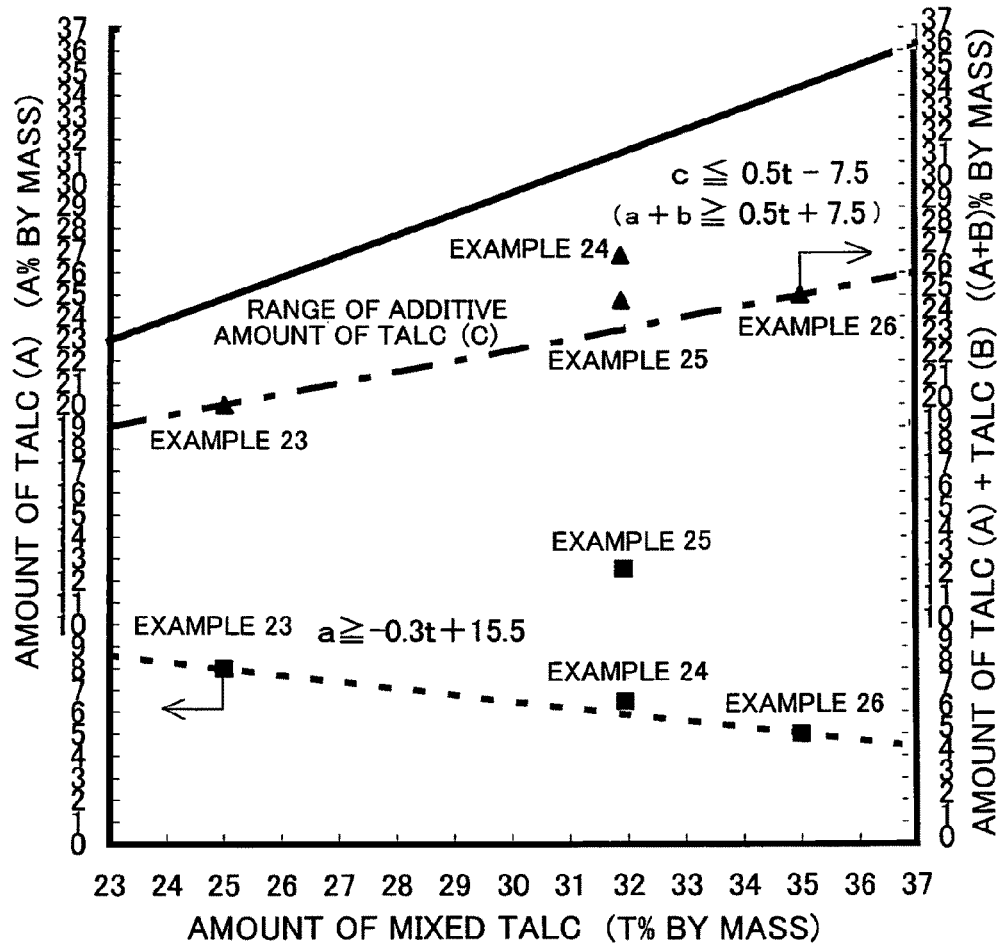
FIG. 4 is a graph showing the relationship between the amount of talc (A) or the amount of talc (C) and the amount of a mixed talc.

In addition, relationships between the amount of talc (A) (a % by mass) and the amount of a mixed talc (t % by mass) in a mixed talc containing talc (A) having an average particle diameter of 0.7 μm of each Example, are shown in FIG. 2 (a mixed talc with talc (B) having an average particle diameter of 2.5 μm), in FIG. 3 (a mixed talc with talc (C) having an average particle diameter of 4.4 μm or 6.2 μm) and in FIG. 4 (a mixed talc with talc (B) having an average particle diameter of 2.5 μm and talc (C) having an average particle diameter of 4.4 μm). In addition, FIG. 4 also shows the relationship between the amount ((a+b) % by mass) made by subtracting the amount of talc (C) having an average particle diameter of 4.4 μm (c % by mass) from the amount of a mixed talc (t % by mass) and the amount of a mixed talc (t % by mass). In each figure (FIGS. 2 to 4), ■ shows the relationship between a % by mass and t % by mass and ▲ shows the relationship between (a+b) % by mass and t % by mass. The solid straight line indicates the amount of the mixed talc; the broken line indicates a lower limit of the content of talc (A); and the alternate long and short dash line indicates a lower limit of the total content of talc (A) and talc (B) (an area between the solid straight line and the alternate long and short dash line is a range of the content of talc (C), that is, a range of the additive amount of talc (C).

TABLE 6

| | | | Example 18 | Example 19 | Example 20 | Example 21 | Example 22 | Example 23 | Example 24 | Example 25 | Example 26 | Example 27 | Example 28 |
|---|---|---|---|---|---|---|---|---|---|---|---|---|---|
| Formulation | ethylene-propylene block copolymer (b-PP) | b-PP2 | | | | | | | | | | | |
| | | b-PP3 | 35 | 42 | 35 | 35 | 32 | 42 | 35 | 35 | 32 | 42 | 35 |
| | | b-PP4 | | | | | | | | | | | |
| | | b-PP5 | | | | | | | | | | | |
| | | b-PP6 | | | | | | | | | | | |
| | homo-polypropylene resin (h-PP) | h-PP1 | 20 | 20 | 20 | 20 | 20 | 20 | 20 | 20 | 20 | 20 | 20 |
| | | h-PP2 | | | | | | | | | | | |
| | | h-PP3 | | | | | | | | | | | |
| | EPM (36 ML(1 + 4) 100° C.) | | | | | | | | | | | | |
| | EBM (65 ML(1 + 4) 100° C.) | | | | | | | | | | | | |
| | EOM (45 ML(1 + 4) 100° C.) | | 13 | 13 | 13 | 13 | 13 | 13 | 13 | 13 | 13 | 13 | 13 |
| | EPDM (74 ML(1 + 4) 100° C.) | | | | | | | | | | | | |
| | SEBS (styrene amount: 18% by mass) | | | | | | | | | | | | |
| | Talc(C) (average particle diameter: 6.2 μm) | | | | | | | | | | | | |
| | Talc(C) (average particle diameter: 4.4 μm) | | | | | | | | 5 | 6 | 8 | 10 | 5 | 8 |
| | Talc(B) (average particle diameter: 2.5 μm) | | | 19 | 20 | 12 | 31 | 12 | 20 | 12 | 20 | | |
| | Talc(A) (average particle diameter: 0.7 μm) | | 32 | 6 | 12 | 20 | 4 | 8 | 6 | 12 | 5 | 20 | 24 |
| | Total amount of talc | | 32 | 25 | 32 | 32 | 35 | 25 | 32 | 32 | 35 | 25 | 32 |
| Physical property | MFR (g/10 min) | | 35.6 | 38.9 | 38.2 | 37.8 | 32.7 | 41.2 | 40.3 | 39.3 | 33.1 | 40.3 | 38.1 |
| | flexural modulus (MPa) | | 2910 | 2803 | 2967 | 2960 | 2822 | 2800 | 2910 | 2966 | 2811 | 2800 | 2988 |
| | Izod impact strength (kJ/m$^2$) | | 24.1 | 20.3 | 24.5 | 24.5 | 20.9 | 20.4 | 25.9 | 25.8 | 20.5 | 26.8 | 25.2 |

| | | | Example 29 | Example 30 | Example 31 | Example 32 | Example 33 | Example 34 | Example 35 | Example 36 | Example 37 |
|---|---|---|---|---|---|---|---|---|---|---|---|
| Formulation | ethylene-propylene block copolymer (b-PP) | b-PP2 | | | | 38 | | 35 | | | |
| | | b-PP3 | 32 | 42 | 32 | | 55 | | | | |
| | | b-PP4 | | | | | | | 35 | 35 | 35 |

TABLE 6-continued

| | | | | | | | | | | | |
|---|---|---|---|---|---|---|---|---|---|---|---|
| | | b-PP5 | | | | | | | | | |
| | | b-PP6 | | | | | | | | | |
| | homo-polypropylene resin (h-PP) | h-PP1 | 20 | 20 | 20 | 20 | 5 | 20 | 20 | 20 | 20 |
| | | h-PP2 | | | | | | | | | |
| | | h-PP3 | | | | | | | | | |
| | EPM (36 ML(1 + 4) 100° C.) | | | | | | | | | | |
| | EBM (65 ML(1 + 4) 100° C.) | | | | | | | | | | 13 |
| | EOM (45 ML(1 + 4) 100° C.) | | 13 | 13 | 13 | 10 | 10 | 13 | 13 | | |
| | EPDM (74 ML(1 + 4) 100° C.) | | | | | | | | | 13 | |
| | SEBS (styrene amount: 18% by mass) | | | | | | | | | | |
| | Talc(C) (average particle diameter: 6.2 μm) | | | | | | | | | | |
| | Talc(C) (average particle diameter: 4.4 μm) | | 12 | | | | | | | | |
| | Talc(B) (average particle diameter: 2.5 μm) | | | | | | | | | | |
| | Talc(A) (average particle diameter: 0.7 μm) | | 23 | 25 | 35 | 32 | 30 | 32 | 32 | 32 | 32 |
| | Total amount of talc | | 35 | 25 | 35 | 32 | 30 | 32 | 32 | 32 | 32 |
| Physical property | MFR (g/10 min) | | 32.8 | 38.4 | 32.1 | 30.3 | 35.6 | 30.0 | 35.7 | 30.5 | 31.1 |
| | flexural modulus (MPa) | | 2954 | 2811 | 3068 | 3031 | 2800 | 2900 | 2973 | 2991 | 2919 |
| | Izod impact strength (kJ/m$^2$) | | 20.5 | 21.8 | 24.8 | 22.1 | 22.8 | 24.5 | 23.2 | 23.2 | 23.9 |

TABLE 7

| | | | Example 38 | Example 39 | Example 40 | Example 41 | Example 42 | Example 43 | Comparative Example 18 | Comparative Example 19 | Comparative Example 20 | Example 44 |
|---|---|---|---|---|---|---|---|---|---|---|---|---|
| Formulation | ethylene-propylene block copolymer (b-PP) | b-PP2 | | | | | | | | | | |
| | | b-PP3 | | | 35 | 35 | 35 | 35 | 47 | 32 | 30 | 48 |
| | | b-PP4 | 35 | 35 | | | | | | | | |
| | | b-PP5 | | | | | | | | | | |
| | | b-PP6 | | | | | | | | | | |
| | homo-polypropylene resin (h-PP) | h-PP1 | 20 | 20 | 20 | 20 | 20 | 20 | 20 | 15 | 30 | 4 |
| | | h-PP2 | | | | | | | | | | |
| | | h-PP3 | | | | | | | | | | |
| | EPM (36 ML(1 + 4) 100° C.) | | 13 | | | | | | | | | |
| | EBM (65 ML(1 + 4) 100° C.) | | | | | | | | | | | |
| | EOM (45 ML(1 + 4) 100° C.) | | | 13 | | 13 | 13 | 13 | 13 | 13 | 10 | 13 |
| | EPDM (74 ML(1 + 4) 100° C.) | | | | | | | | | | | |
| | SEBS (styrene amount: 18% by mass) | | | | 13 | | | | | | | |
| | Talc(C) (average particle diameter: 6.2 μm) | | | 8 | | | | | | | | |
| | Talc(C) (average particle diameter: 4.4 μm) | | | | | 32 | | 8 | 5 | | | |
| | Talc(B) (average particle diameter: 2.5 μm) | | | | | | 32 | 24 | 7.5 | | | |
| | Talc(A) (average particle diameter: 0.7 μm) | | 32 | 24 | 32 | | | | 7.5 | 40 | 30 | 35 |
| | Total amount of talc | | 32 | 32 | 32 | 32 | 32 | 32 | 20 | 40 | 30 | 35 |
| Physical property | MFR (g/10 min) | | 36.1 | 38.1 | 37.8 | 43.8 | 41.1 | 41.9 | 44.6 | 26.7 | 38.2 | 33.8 |
| | flexural modulus (MPa) | | 2906 | 2820 | 2800 | 2707 | 2790 | 2786 | 2387 | 3044 | 3115 | 2784 |
| | Izod impact strength (kJ/m$^2$) | | 21.5 | 21.2 | 26.4 | 22.6 | 20.3 | 20.8 | 26.4 | 13.6 | 14.5 | 17.2 |

| | | | Comparative Example 21 | Comparative Example 22 | Comparative Example 23 | Comparative Example 24 | Comparative Example 25 | Comparative Example 26 | Comparative Example 27 |
|---|---|---|---|---|---|---|---|---|---|
| Formulation | ethylene-propylene block copolymer (b-PP) | b-PP2 | 43 | | | | | | |
| | | b-PP3 | | 30 | 25 | | | | |
| | | b-PP4 | | | | | | 35 | 35 |
| | | b-PP5 | | | | 35 | | | |
| | | b-PP6 | | | | | 35 | | |
| | homo-polypropylene resin (h-PP) | h-PP1 | 20 | 17 | 25 | 20 | 20 | | |
| | | h-PP2 | | | | | | 20 | |
| | | h-PP3 | | | | | | | 20 |

TABLE 7-continued

| | | | | | | | | |
|---|---|---|---|---|---|---|---|---|
| | EPM (36 ML(1 + 4) 100° C.) | | | | | | | |
| | EBM (65 ML(1 + 4) 100° C.) | | | | | | | |
| | EOM (45 ML(1 + 4) 100° C.) | 5 | 23 | 15 | 13 | 13 | 13 | 13 |
| | EPDM (74 ML(1 + 4) 100° C.) | | | | | | | |
| | SEBS (styrene amount: 18% by mass) | | | | | | | |
| | Talc(C) (average particle diameter: 6.2 μm) | | | | | | | |
| | Talc(C) (average particle diameter: 4.4 μm) | | | | | | | |
| | Talc(B) (average particle diameter: 2.5 μm) | | | | | | | |
| | Talc(A) (average particle diameter: 0.7 μm) | 32 | 30 | 35 | 32 | 32 | 32 | 32 |
| | Total amount of talc | 32 | 30 | 35 | 32 | 32 | 32 | 32 |
| Physical property | MFR (g/10 min) | 32.2 | 30.0 | 28.1 | 38.2 | 40.3 | 26.6 | 36.8 |
| | flexural modulus (MPa) | 3255 | 2790 | 2990 | 2897 | 2820 | 2965 | 2772 |
| | Izod impact strength (kJ/m$^2$) | 10.6 | 18.9 | 16.3 | 14.8 | 13.2 | 16.8 | 15.9 |

Each sample was kneaded (mixed) using a twin-screw extruder.

Particularly with respect to a sample in which talc (A) having an average particle diameter of less than 1 μm is blended in a large amount, due to a small particle diameter (average particle diameter) of talc (A), the sample has a large bulk (small bulk density) and a large specific surface area, so that the sample is difficult to be mixed. Accordingly, about half of the blending amount of talc (A) was blended in twice through side feeding using a twin-screw extruder having a large L/D.

For example, in Example 31, raw material components such as resins (32% by mass of ethylene-propylene block copolymer, 20% by mass of homo-polypropylene resin and 13% by mass of ethylene-octane copolymer rubber) together with 15% by mass of talc (A) having an average particle diameter of 0.7 μm were charged (breech-loaded) into a twin-screw extruder having an L/D of 80 and during mixing, talc (A) was charged in twice, 10% by mass at each time, through side feeding to knead (mix) the mixture.

As is apparent from the above results, all of Examples (Examples 18 to 44) could secure high fluidity (high MFR), high rigidity (high flexural modulus) and high impact resistance (high Izod impact strength) required for a resin composition capable of responding to the thinning of resin products for the automobile inner and outer package containing polypropylene resins.

In addition, in Examples 19 to 29 and 39 using a mixed talc composed of talc (A) having an average particle diameter of 0.7 μm and talcs having other average particle diameters (2.5 μm, 4.4 μm and 6.2 μm), while securing high fluidity, high rigidity and high impact resistance, the cost could be reduced.

Using resin compositions of Examples (Examples 18 to 44), a deck side trim, an instrument panel, a bumper or the like having a wall thickness of sites other than reinforced sites thereof of 1.0 mm could be molded under the following molding conditions.

Injection molding machine: trade name: "IS 1800"; manufactured by Toshiba Corporation Mold temperature: 25° C. (oil temperature)

Molding temperature: 200 to 240° C.

Injection pressure:

during injection; 1,650 kgf/cm$^2$ (162 MPa)

during retention; 850 kgf/cm$^2$ (83.3 MPa)

Injection time: 15 sec

Cooling time: 25 sec

In addition, these resin products could satisfy performances as the product (thermal shock, rigidness, impact by ball-drop).

Next, an effect of the dynamic vulcanization was studied. As Examples of the present invention, the physical properties of the resin compositions were measured in 16 types of formulations shown in the following Tables 8 and 9. In addition, as Comparative Examples, the physical properties of the resin compositions were measured in 11 types of formulations shown in the following Table 9. The unit of a blending amount of each raw material component in the column of the formulation in each table is % by mass. However, an amount of the crosslinker is indicated in a unit of parts by mass relative to 100 parts by mass of the total amount of ethylene-propylene block copolymer, homo-polypropylene resin, elastomer and talc.

As raw material components in Examples and Comparative Examples of the present invention, there were used 6 types of ethylene-propylene block copolymers (b-PP) having different physical properties described in Table 4; 3 types of homo-polypropylene resin (h-PP) having different physical properties and the like described in Table 5; 5 types of ethylene-α-olefin copolymer rubbers, such as ethylene-propylene copolymer rubber (EPM), 2 types of ethylene-butene copolymer rubbers (EBM) having different Mooney viscosities, ethylene-octene copolymer rubber (EOM) and ethylene-propylene-nonconjugated diene copolymer rubber (EPDM); and 3 types of talcs having different average particle diameters (4.4 μm, 6.2 μm and 8.1 μm). In addition, for a crosslinker, α,α'-bis(t-butylperoxy)diisopropyl benzene (trade name: PERBUTYL P40; manufactured by NOF Corporation (active component: 40% by mass)) as an organic peroxide crosslinker, and brominated alkylphenolformaldehyde resin (trade name: TACKROL 250-I; manufactured by Taoka Chemical Co., Ltd.) as a phenol-based crosslinker, were used.

TABLE 8

| | | | Example 45 | Example 46 | Example 47 | Example 48 | Example 49 | Example 50 | Example 51 | Example 52 |
|---|---|---|---|---|---|---|---|---|---|---|
| Formulation | ethylene-propylene block copolymer (b-PP) | b-PP1 | | | | | | | | |
| | | b-PP2 | 35 | | | | | | | |
| | | b-PP3 | | 35 | | 30 | 40 | 55 | 35 | 35 |
| | | b-PP4 | | | 35 | | | | | |
| | | b-PP5 | | | | | | | | |
| | | b-PP6 | | | | | | | | |
| | homo-polypropylene resin (h-PP) | h-PP1 | 20 | 20 | 20 | 25 | 15 | 10 | 20 | 20 |
| | | h-PP2 | | | | | | | | |
| | | h-PP3 | | | | | | | | |
| | EPM (36 ML(1 + 4) 100° C.) | | | | | | | | | 13 |
| | EBM (40 ML(1 + 4) 100° C.) | | | | | | | | | |
| | EBM (65 ML(1 + 4) 100° C.) | | | | | | | | | |
| | EOM (45 ML(1 + 4) 100° C.) | | 13 | 13 | 13 | 13 | 13 | 10 | 13 | |
| | EPDM (74 ML(1 + 4) 100° C.) | | | | | | | | | |
| | Talc(D) (average particle diameter: 8.1 μm) | | | | | | | | | |
| | Talc(C) (average particle diameter: 6.2 μm) | | | | | | | | | |
| | Talc(C) (average particle diameter: 4.4 μm) | | 32 | 32 | 32 | 32 | 32 | 25 | 32 | 32 |
| | Cross-linker | Organic peroxide (amount of active component) | 0.2 (0.08) | 0.2 (0.08) | 0.2 (0.08) | 0.2 (0.08) | 0.2 (0.08) | 0.2 (0.08) | 0.4 (0.16) | 0.2 (0.08) |
| | | Phenol-based crosslinker (amount of active component) | | | | | | | | |
| Physical property | MFR (g/10 min) | | 30.5 | 38.7 | 39.8 | 35.5 | 36.4 | 38.3 | 30.2 | 47.3 |
| | flexural modulus (MPa) | | 2820 | 2901 | 2800 | 3050 | 2880 | 2800 | 2902 | 2844 |
| | Izod impact strength (kJ/m$^2$) | | 22.8 | 24.9 | 21.2 | 22.2 | 23.3 | 20.5 | 23.2 | 20.5 |

| | | | Example 53 | Example 54 | Example 55 | Example 56 | Example 57 | Example 58 | Example 59 |
|---|---|---|---|---|---|---|---|---|---|
| Formulation | ethylene-propylene block copolymer (b-PP) | b-PP1 | | | | | | | |
| | | b-PP2 | | | | | | | |
| | | b-PP3 | 35 | 35 | 35 | 30 | 35 | 35 | 35 |
| | | b-PP4 | | | | | | | |
| | | b-PP5 | | | | | | | |
| | | b-PP6 | | | | | | | |
| | homo-polypropylene resin (h-PP) | h-PP1 | 20 | 20 | 20 | 18 | 20 | 20 | 20 |
| | | h-PP2 | | | | | | | |
| | | h-PP3 | | | | | | | |
| | EPM (36 ML(1 + 4) 100° C.) | | | | | | | | |
| | EBM (40 ML(1 + 4) 100° C.) | | 13 | | | | | | |
| | EBM (65 ML(1 + 4) 100° C.) | | | 13 | | | | | |
| | EOM (45 ML(1 + 4) 100° C.) | | | | | 20 | 10 | 13 | 13 |
| | EPDM (74 ML(1 + 4) 100° C.) | | | | 13 | | | | |
| | Talc(D) (average particle diameter: 8.1 μm) | | | | | | | | |
| | Talc(C) (average particle diameter: 6.2 μm) | | | | | | | 32 | |
| | Talc(C) (average particle diameter: 4.4 μm) | | 32 | 32 | 32 | 32 | 35 | | 32 |
| | Cross-linker | Organic peroxide (amount of active component) | 0.2 (0.08) | 0.2 (0.08) | 0.2 (0.08) | 0.2 (0.08) | 0.2 (0.08) | 0.2 (0.08) | |
| | | Phenol-based crosslinker (amount of active component) | | | | | | | 0.2 (0.2) |
| Physical property | MFR (g/10 min) | | 42.8 | 31.1 | 30.0 | 31.0 | 36.4 | 39.3 | 39.2 |
| | flexural modulus (MPa) | | 2875 | 2880 | 2995 | 2825 | 3025 | 2922 | 3013 |
| | Izod impact strength (kJ/m$^2$) | | 21.4 | 23.0 | 25.5 | 28.3 | 21.1 | 22.2 | 25.4 |

TABLE 9

| | | | Comparative Example 28 | Example 60 | Comparative Example 29 | Comparative Example 30 | Comparative Example 31 | Comparative Example 32 | Comparative Example 33 |
|---|---|---|---|---|---|---|---|---|---|
| Formulation | ethylene-propylene block copolymer (b-PP) | b-PP1 | 35 | | | | | | |
| | | b-PP2 | | | | | | | |
| | | b-PP3 | | 35 | | | 35 | 35 | 35 |
| | | b-PP4 | | | | | | | |
| | | b-PP5 | | | 35 | | | | |
| | | b-PP6 | | | | 35 | | | |
| | homo-polypropylene resin (h-PP) | h-PP1 | 20 | 20 | 20 | 20 | 20 | | |
| | | h-PP2 | | | | | | 20 | |
| | | h-PP3 | | | | | | | 20 |
| | EPM (36 ML(1 + 4) 100° C.) | | | | | | | | |
| | EBM (40 ML(1 + 4) 100° C.) | | | | | | | | |
| | EBM (65 ML(1 + 4) 100° C.) | | | | | | | | |
| | EOM (45 ML(1 + 4) 100° C.) | | 13 | 13 | 13 | 13 | 13 | 13 | 13 |
| | EPDM (74 ML(1 + 4) 100° C.) | | | | | | | | |
| | Talc(D) (average particle diameter: 8.1 μm) | | | | | | | | |
| | Talc(C) (average particle diameter: 6.2 μm) | | | | | | | | |
| | Talc(C) (average particle diameter: 4.4 μm) | | 32 | 32 | 32 | 32 | 32 | 32 | 32 |
| | Crosslinker | Organic peroxide (amount of active component) | 0.2 (0.08) | | 0.2 (0.08) | 0.2 (0.08) | 0.5 (0.2) | 0.2 (0.08) | 0.2 (0.08) |
| | | Phenol-based crosslinker (amount of active component) | | | | | | | |
| Physical property | MFR (g/10 min) | | 26.8 | 43.8 | 43.4 | 46.6 | 26.5 | 28.1 | 44.4 |
| | flexural modulus (MPa) | | 2798 | 2707 | 2805 | 2811 | 2829 | 2820 | 2487 |
| | Izod impact strength (kJ/m$^2$) | | 24.0 | 22.6 | 12.1 | 9.8 | 13.5 | 24.3 | 26.7 |

| | | | Comparative Example 34 | Comparative Example 35 | Comparative Example 36 | Comparative Example 37 | Comparative Example 38 |
|---|---|---|---|---|---|---|---|
| Formulation | ethylene-propylene block copolymer (b-PP) | b-PP1 | | | | | |
| | | b-PP2 | | | | | |
| | | b-PP3 | 30 | 30 | 40 | 35 | 35 |
| | | b-PP4 | | | | | |
| | | b-PP5 | | | | | |
| | | b-PP6 | | | | | |
| | homo-polypropylene resin (h-PP) | h-PP1 | 30 | 13 | 25 | 15 | 20 |
| | | h-PP2 | | | | | |
| | | h-PP3 | | | | | |
| | EPM (36 ML(1 + 4) 100° C.) | | | | | | |
| | EBM (40 ML(1 + 4) 100° C.) | | | | | | |
| | EBM (65 ML(1 + 4) 100° C.) | | | | | | |
| | EOM (45 ML(1 + 4) 100° C.) | | 10 | 25 | 15 | 10 | 13 |
| | EPDM (74 ML(1 + 4) 100° C.) | | | | | | |
| | Talc(D) (average particle diameter: 8.1 μm) | | | | | | 32 |
| | Talc(C) (average particle diameter: 6.2 μm) | | | | | | |
| | Talc(C) (average particle diameter: 4.4 μm) | | 30 | 32 | 20 | 40 | |
| | Crosslinker | Organic peroxide (amount of active component) | 0.2 (0.08) | 0.2 (0.08) | 0.2 (0.08) | 0.2 (0.08) | 0.2 (0.08) |
| | | Phenol-based crosslinker (amount of active component) | | | | | |
| Physical property | MFR (g/10 min) | | 33.3 | 27.9 | 40.1 | 32.8 | 44.5 |
| | flexural modulus (MPa) | | 3111 | 2699 | 2669 | 3117 | 2880 |
| | Izod impact strength (kJ/m$^2$) | | 18.6 | 29.4 | 25.8 | 18.5 | 15.2 |

By kneading each sample at a set temperature of 160 to 200° C. using a twin-screw extruder and by adding a crosslinker during kneading, an elastomer was dynamically crosslinked.

For example, in Example 46, raw material components of resins (35% by mass of ethylene-propylene block copolymer, 20% by mass of homo-polypropylene resin and 13% by mass of ethylene-octene copolymer rubbed together with 20% by mass of talc having an average particle diameter of 4.4 μm were charged (breech-loaded) into a twin-screw extruder having an L/D of 80 and a set temperature of 160 to 200° C. Then, during mixing, remained 12% by mass of talc and 0.2 parts by mass (amount of active component was 0.08 parts by mass) of "PERBUTYL P40" were charged through side feeding to knead (dynamically crosslink) the mixture.

As is apparent from the above results, all of Examples (Examples 45 to 60) could secure high fluidity (high MFR), high rigidity (high flexural modulus) and high impact resistance (high Izod impact strength) required for a resin composition capable of responding to the thinning of resin products for the automobile inner and outer package containing polypropylene resins.

Using resin compositions of Examples (Examples 45 to 60), a deck side trim, an instrument panel, a bumper or the like having a wall thickness of sites other than reinforced sites thereof of 1.0 mm could be molded under the following molding conditions.

Injection molding machine: trade name: "IS 1800"; manufactured by Toshiba Corporation
Mold temperature: 25° C. (oil temperature)
Molding temperature: 200 to 240° C.
Injection pressure:
during injection; 1,650 kgf/cm$^2$ (162 MPa)
during retention; 850 kgf/cm$^2$ (83.3 MPa)
Injection time: 15 sec
Cooling time: 25 sec In addition, these resin products could satisfy performances as the product (thermal shock, rigidness, impact by ball-drop).

In addition, the scope of the present invention should not be construed as limited by Examples and so long as not departing from the effect of the present invention, the present invention can be embodied by appropriately varying it.

The invention claimed is:

1. A resin composition comprising:
30 to 65% by mass of an ethylene-propylene block copolymer having a melt flow rate of 60 to 120 g/10 min at 230° C. under 21.2 N measured according to ISO 1133 and a Charpy impact strength of 3 kJ/m$^2$ or more measured according to ISO 179;
0 to 25% by mass of a homo-polypropylene resin having a melt flow rate of 10 to 21 g/10 min at 230° C. under 21.2 N measured according to ISO 1133 and a flexural modulus of 2,000 Mpa or more measured according to ISO 178;
6 to 20% by mass of an elastomer, the elastomer including at least one ethylene-α-olefin copolymer rubber; and
25 to 37% by mass of a talc having an average particle diameter of 8 μm or less measured by a laser diffraction scattering particle size distribution measuring method,
wherein the resin composition has
a flexural modulus measured according to ISO 178 is 2,600 to 3,148 MPa,
an Izod impact strength at 23° C. measured according to ISO 180 is 16.5 to 28.3 kJ/m$^2$, and
a melt flow rate at 230° C. under 21.2 N measured according to ISO 1133 is 30 to 44 g/10 min.

2. The resin composition according to claim 1, wherein
the talc has an average measured particle diameter of 0.1 to 0.7 μm as obtained by measuring a diameter of a perfect circle having the same area as each area of a plurality of talcs appearing in a range of 400 square μm of a cross section of a molded article of the resin composition and by averaging the diameter; and an average distance between particles of 0.1 to 0.9 μm as obtained by measuring respective distances between each talc appearing in the range and another selected ten talcs whose distances therefrom are the first to tenth smallest distances in ascending order; calculating each average distance of these measure distances; and averaging the average distance,
and a rubber particle containing the elastomer has an average measured particle diameter of 0.2 to 0.5 μm as obtained by measuring a diameter of a perfect circle having the same area as each area of a plurality of rubber particles appearing in a range of 100 square μm of a cross section of a molded article of the resin composition and by averaging the diameter; and an average distance between particles of 0.3 to 1.3 μm as obtained by measuring respective distances between each rubber particle appearing in the range and another selected ten rubber particles whose distances therefrom are the first to tenth smallest distances in ascending order; calculating each average distance of these measure distances; and averaging the average distance.

3. The resin composition according to claim 1, wherein the homo-polypropylene resin contains a rigid component having a relatively short relaxation time (T2) at 23° C. measured with a pulse NMR by a solid echo method; and another component having a relatively long relaxation time (T2), and a ratio of the rigid component is 92.4 to 93.0% by mass.

4. The resin composition according to claim 1, comprising:
30 to 55% by mass of the ethylene-propylene block copolymer;
5 to 25% by mass of the homo-polypropylene resin;
8 to 20% by mass of the elastomer, the elastomer includes at least one ethylene-α-olefin copolymer rubber; and
25 to 37% by mass of the talc having the average particle diameter of 7 μm or less, wherein
the talc is produced by blending on purpose 3% by mass or more of the talc (A) having the average particle diameter of less than 1 μm,
the flexural modulus of the resin composition is 2,800 to 3,148 MPa,
the Izod impact strength of the resin composition is 16.5 to 28.3 kJ/m$^2$, and
the melt flow rate of the resin composition is 30 to 44 g/10 min.

5. The resin composition according to claim 4, wherein the talc is composed only of the talc (A) having the average particle diameter of less than 1 μm.

6. The resin composition according to claim 4, wherein
the talc is a mixed talc composed of the talc (A) having the average particle diameter of less than 1 μm and the talc (B) having the average particle diameter of 1 μm or more and less than 4 μm, and
the talc (A) is present in an amount satisfying a relationship:
a≥0.2t+11.0, and
a=percent by mass of talc (A) and t=percent by mass of the mixed talc.

7. The resin composition according to claim 4, wherein
the talc is a mixed talc composed of the talc (A) having the average particle diameter of less than 1 μm and the talc (C) having the average particle diameter of 4 μm or more and 7 μm or less, and
the talc (A) is present in an amount satisfying a relationship:
$a \geq 0.3t+12.5$, and
a=percent by mass of talc (A) and t=percent by mass of the mixed talc.

8. The resin composition according to claim 4, wherein
the talc is a mixed talc composed of the talc (A) having the average particle diameter of less than 1 μm, the talc (B) having the average particle diameter of 1 μm or more and less than 4 μm, and the talc (C) having the average particle diameter of 4 μm or more and 7 μm or less,
the talc (A) and the talc (C) are present in and amounts satisfying relationships:
$a \geq 0.3t+15.5$,
$c \leq 0.5t-7.5$, and
a=percent by mass of talc (A), c=percent by mass of talc (C) and t=percent by mass of the mixed talc.

9. The resin composition according to claim 1, comprising:
30 to 55% by mass of the ethylene-propylene block copolymer;
10 to 25% by mass of the homo-polypropylene resin;
10 to 20% by mass of the elastomer in which at least a part of the elastomer is dynamically crosslinked using a crosslinker; and
25 to 37% by mass of the talc having the average particle diameter of 8 μm or less, wherein
an additive amount of an active component of the crosslinker is 0.02 to 0.25 parts by mass relative to 100 parts by mass of a total amount of the ethylene-propylene block copolymer, the homo-polypropylene resin, the elastomer and the talc,
the flexural modulus of the resin composition is 2,800 to 3,148 MPa,
the Izod impact strength of the resin composition is 20 to 28.3 kJ/m², and
the melt flow rate of the resin composition is 30 to 44 g/10 min.

10. The resin composition according to claim 1, wherein the elastomer is 11 to 17% by mass of the at least one ethylene-α-olefin copolymer rubber.

11. The resin composition according to claim 10, wherein the ethylene-α-olefin copolymer rubber is an ethylene-propylene copolymer rubber, an ethylene-butene copolymer rubber, an ethylene-octene copolymer rubber or an ethylene-propylene-nonconjugated diene copolymer rubber and a Mooney viscosity measured according to ISO 667 is 20 to 75 under conditions: a shape of a rotor of an L shape, a pre-heating time of 1 minute, a rotation time of a rotor of 4 minutes, and 100° C.

12. The resin composition according to claim 1, wherein a site other than a reinforced site of a molded article can be molded with a wall-thickness of less than 2 mm.

13. A resin product produced by molding the resin composition as claimed in claim 1.

14. A resin product produced by molding a resin composition comprising:
30 to 65% by mass of an ethylene-propylene block copolymer having a melt flow rate of 60 to 120 g/10 min at 230° C. under 21.2 N measured according to ISO 1133 and a Charpy impact strength of 3 kJ/m² or more measured according to ISO 179;
0 to 25% by mass of a homo-polypropylene resin having a melt flow rate of 10 to 21 g/10 min at 230° C. under 21.2 N measured according to ISO 1133 and a flexural modulus of 2,000 MPa or more measured according to ISO 178;
6 to 20% by mass of an elastomer, the elastomer is at least one ethylene-α-olefin copolymer rubber; and
25 to 37% by mass of a talc, wherein
the talc has an average measured particle diameter of 0.1 to 0.7 μm as obtained by measuring a diameter of a perfect circle having the same area as each area of a plurality of talcs appearing in a range of 400 square μm of a cross section of the resin product and by averaging the diameter; and an average distance between particles of 0.1 to 0.9 μm as obtained by measuring respective distances between each talc appearing in the range and another selected ten talcs whose distances therefrom are the first to tenth smallest distances in ascending order; calculating each average distance of these measured distances; and averaging the average distance,
a rubber particle containing the elastomer has an average measured particle diameter of 0.2 to 0.5 μm as obtained by measuring a diameter of a perfect circle having the same area as each area of a plurality of rubber particles appearing in a range of 100 square μm of a cross section of the resin product and by averaging the diameter; and an average distance between particles of 0.3 to 1.3 μm as obtained by measuring respective distances between each rubber particle appearing in the range and another selected ten rubber particles whose distances therefrom are the first to tenth smallest distances in ascending order; calculating each average distance of these measured distances; and averaging the average distance,
the resin product having
a flexural modulus measured according to ISO 178 is 2,600 to 3,148 MPa,
an Izod impact strength at 23° C. measured according to ISO 180 is 16.5 to 28.3 kJ/m², and
a melt flow rate at 230° C. under 21.2 N measured according to ISO 1133 is 30 to 44 g/10 min.

* * * * *